United States Patent
Roger et al.

(10) Patent No.: US 11,332,566 B2
(45) Date of Patent: May 17, 2022

(54) POLYMERS, METHODS FOR PREPARING SAME, AND USES THEREOF PARTICULARLY FOR METAL CAPTURE

(71) Applicant: UNIVERSITE PARIS-SACLAY, Saint Aubin (FR)

(72) Inventors: Philippe Gérard Roger, Limours (FR); Mohamad Maaz, Beirut (LB); Bilal Nsouli, Beirut (LB); Tamara Elzein, Beirut (LB); Nadine Barroca-Aubry, Orsay (FR); Bénédicte Lepoittevin, Orsay (FR)

(73) Assignee: UNIVERSITE PARIS-SACLAY, Saint Aubin (FR)

( * ) Notice: Subject to any disclaimer, the term of this patent is extended or adjusted under 35 U.S.C. 154(b) by 0 days.

(21) Appl. No.: 16/652,842

(22) PCT Filed: Oct. 2, 2017

(86) PCT No.: PCT/FR2017/052705
§ 371 (c)(1),
(2) Date: Apr. 1, 2020

(87) PCT Pub. No.: WO2019/068961
PCT Pub. Date: Apr. 11, 2019

(65) Prior Publication Data
US 2020/0231729 A1    Jul. 23, 2020

(51) Int. Cl.
| | | |
|---|---|---|
| *C08F 26/06* | (2006.01) | |
| *C08F 226/06* | (2006.01) | |
| *B01J 20/26* | (2006.01) | |
| *C02F 1/28* | (2006.01) | |
| *C08F 293/00* | (2006.01) | |
| *C22B 60/02* | (2006.01) | |
| *C02F 101/00* | (2006.01) | |
| *C02F 103/08* | (2006.01) | |
| *G21F 9/12* | (2006.01) | |

(52) U.S. Cl.
CPC .......... *C08F 226/06* (2013.01); *B01J 20/264* (2013.01); *B01J 20/267* (2013.01); *C02F 1/285* (2013.01); *C08F 293/005* (2013.01); *C22B 60/0265* (2013.01); *C02F 2101/006* (2013.01); *C02F 2103/08* (2013.01); *C08F 2438/01* (2013.01); *G21F 9/12* (2013.01)

(58) Field of Classification Search
CPC ....... C08F 26/06; C08F 126/06; C08F 226/06
See application file for complete search history.

(56) References Cited

U.S. PATENT DOCUMENTS

| | | | |
|---|---|---|---|
| 4,199,470 A | 4/1980 | Yasuda et al. | |
| 4,424,359 A * | 1/1984 | Kaschig ............... | C07D 213/22 546/255 |
| 4,713,422 A | 12/1987 | Kaschig et al. | |
| 2004/0106006 A1 | 6/2004 | Eriyama et al. | |

FOREIGN PATENT DOCUMENTS

| | | |
|---|---|---|
| JP | 1985-217219 A | 10/1985 |
| JP | 1989-065105 A | 3/1989 |
| JP | 2003-253257 A | 9/2003 |
| JP | 2013-080178 A | 5/2013 |

OTHER PUBLICATIONS

Convertine, Macromolecules 2003, 36, 4670-4681 (Year: 2003).*
International Search Report, dated Jun. 25, 2018, from corresponding PCT application No. PCT/FR2017/052705.
Li et al.; Highly luminescent hydrogels synthesized by covalent grafting of lanthanide complexes onto PNIPAM via one-pot free radical polymerization; Journal of Materials Chemistry C; Jan. 1, 2016; pp. 3195-3201; vol. 4, No. 15.

* cited by examiner

*Primary Examiner* — Robert C Boyle
(74) *Attorney, Agent, or Firm* — Nixon & Vanderhye

(57) ABSTRACT

Disclosed are novel polymers that contain monomer units derived from 4-vinylpyridine and monomer units derived from a co-monomer. The polymers may be complexed with a metal, and linear or crosslinked. Also disclosed are methods for preparing these polymers by radical polymerization, as well as to their use for metal capture in aqueous media, particularly uranium capture in seawater or in final nuclear waste from nuclear power plants.

20 Claims, 1 Drawing Sheet

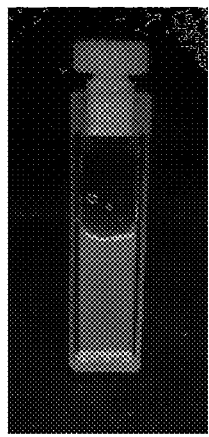
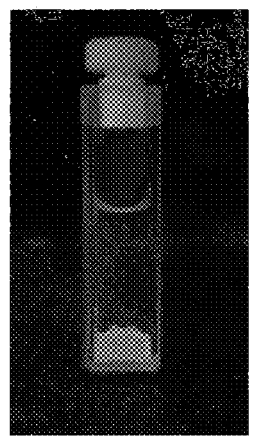
Figure 1A                                  Figure 1B

POLYMERS, METHODS FOR PREPARING SAME, AND USES THEREOF PARTICULARLY FOR METAL CAPTURE

The present invention relates to new polymers, their preparation methods and their uses, in particular for the capture of metals.

Uranium, in its current form (mining) is a non-renewable resource whose resources known today represent about a century of consumption. Two possibilities can be exploited to help overcome the uranium shortage:
 draw dissolved uranium from the oceans,
 Recycle used fuel to reduce the loss of fissile material via final waste.

The oceans, with an estimated reserve of 4,500 million tons (nearly 1,000 times the terrestrial reserves) represent an interesting source of nuclear fuel with more than a millennium of consumption. In recent years, research has intensified to discover simple means of recovering uranium from seawater present at 3.3 ppb.

New materials, generally polymers, have been developed for the capture of marine uranium. After being immersed in seawater, these polymers form a uranium-polymer complex, and allow the extraction of uranium from seawater. The reprocessing of these polymers out of water makes it possible to decomplex the uranium and to recover it. But the presence of poisons for polymers reduces the effectiveness of this method. The vanadium present in seawater competes with uranium and complexes with current polymers instead of uranium, which limits the recovery capacity of these polymers.

The recycling of used fuels from nuclear power stations is already integrated into the life cycle of uranium. Currently, the reprocessing of uranium is based on liquid-liquid extraction methods in the presence of complexing compounds such as the DIAMEX or PUREX methods. These techniques use toxic compounds and have a very high cost.

One aspect of the invention relates to new polymers which are both soluble and insoluble depending on the conditions of the medium in which they are found and which can easily pass from one state to another.

Another aspect of the invention relates to new polymers that are capable of being able to complex with metals, in particular with metals in the form of a trace in the medium in which they are found.

Another aspect of the invention relates to methods for capturing metals and in particular uranium, in particular in seawater.

Another aspect of the invention relates to a method for the selective capture of uranium in seawater, with high yields.

Another aspect of the invention relates to a method for the reprocessing of spent nuclear fuel for the recovery of unreacted fissile materials.

Another aspect of the invention relates to the use of new polymers complexed with metals as catalysts in homogeneous or heterogeneous catalysis.

Another aspect of the invention relates to the use of new polymers for labeling cells in the biomedical field, or the labeling of luxury products in the field of fighting counterfeiting.

The present invention relates to a composition comprising or consisting of a polymer having a degree of polymerization n, ranging from 2 to 10000, and containing 2 to 10000 monomer units, said monomer units being:
 either monomer units derived from 4-vinylpyridine, in which the carbons in position 2 and 6 can be substituted by one of the substituents of the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 cycles in which the heteroatom is either nitrogen, oxygen, sulfur or phosphorus, amide of 1 to 20 carbons, thiols of 1 to 20 carbons, phosphine of 1 to 20 carbons, said substituents can be cyclized with each other and can contain sulfur- or phosphorus atoms,
 or monomer units derived from a co-monomer,
 provided that when one of the substituents chosen in position 2 (respectively in position 6) represents either hydrogen, or an alkyl radical of 1 to 4 carbons, or an aryl radical of 1 to 4 carbons, or an alkene radical of 1 to 4 carbons, the other substituent in position 6 (respectively in position 2) is different from hydrogen, from the alkyl radical from 1 to 4 carbons, from the aryl radical from 1 to 4 carbons, and the alkene radical of 1 to 4 carbons,
 and provided that said monomer units derived from 4-vinylpyridine represent at least 20% of the degree of polymerization n,
said polymer optionally being complexed with a metal,
said polymer being linear or cross-linked.

The polymers according to the present invention have the advantage of having different solubility properties depending on the substituent groups on the monomer units derived from 4-vinylpyridine and on the organization of the constituent monomer units of the polymer. For example, when the substituent groups in position 2 and 6 of all the monomer units are carboxylic acid groups, the solubility of the polymer thus obtained varies according to the pH of the solution. In neutral or basic medium, the polymer is soluble in aqueous medium. In very acidic aqueous medium, the polymer becomes insoluble. This property makes it possible to easily vary the solubility of the polymer obtained and thus to change the behavior of the polymer for the capture of metals.

The polymers according to the present invention have the advantage of being unsupported, which makes them usable in homogeneous catalysis.

The polymers according to the present invention comprise more than 20% of monomer units derived from 4-vinylpyridine, in particular more than 30%, in particular more than 40%, in particular more than 50%, in particular more than 60%, in particular more than 70%, in particular more than 80%, in particular more than 90% and in particular 100%.

The polymers according to the present invention are adaptable and can be optimized according to the difficulties encountered. For example, in the case where the substituent groups in position 2 and 6 are very bulky, a spacer co-monomer can be added at significant rates (>50%) to limit the steric hindrance around the monomer units derived from 4-vinylpyridine.

The polymers according to the present invention can comprise:
 a) either a single type of monomer unit derived from 4-vinylpyridine, without a monomer unit derived from a co-monomer, the polymer is then a homopolymer,
 b) or a single type of monomer units derived from 4-vinylpyridine, and a single type of monomer units derived from a co-monomer, the polymer is then a copolymer, c) or a single type of monomer unit derived from 4-vinylpyridine, and several types of monomer unit derived from a different co-monomer, the polymer is then a copolymer, d) or several different types of monomer units derived from 4-vinylpyridine, without a monomer unit derived from a co-monomer, e) or several different types of monomer units derived from 4-vinylpyridine, and only one type of monomer units derived from a co-monomer, the polymer is then a copolymer, f) or several different types of monomer units derived from 4-vinylpyridine, and several different types of monomer units derived from a co-monomer, the polymer is then a copolymer.

According to the present invention, the term "homopolymer" means a polymer in which all the constituent monomer units of the polymer have the same formula, that is to say that all the monomer units are monomer units derived from 4-vinylpyridine and all the monomer units derived from 4-vinylpyridine have the same substituent groups in position 2, as well as in position 6. The metals optionally complexed on the monomer units can vary within the same homopolymer. The conjugate forms of the same acid/base couple are considered to be identical for the concept of homopolymer. For example, a polymer having a COOH group on a first monomer unit and a COO⁻ group on a second monomer unit will remain to be considered as a homopolymer.

According to the present invention, the term "copolymer" means a polymer in which at least one monomer unit is derived from a co-monomer and at least one monomer unit is derived from 4-vinylpyridine.

The polymers according to the present invention are complexed or not with a metal, for example a complex

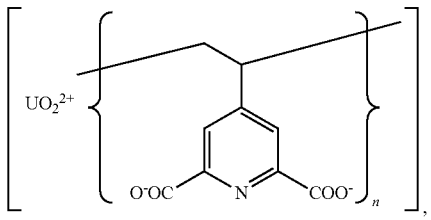

each monomer unit may or may not be complexed with a metal independently of each other. The polymers according to the present invention can form particles, in particular of a micrometric size or in particular of a nanometric size.

According to the present invention, the term "derivative of 4-vinylpyridine" means a compound of formula

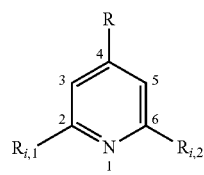

in which $R_{i,1}$ and $R_{i,2}$ may be substituted by one of the substituents of the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amino of 1 to 20 carbons, heterocycle of 1 to 5 rings of which the heteroatom is either nitrogen, either oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms.

According to the present invention a "monomer derived from 4-vinylpyridine" means a compound of formula

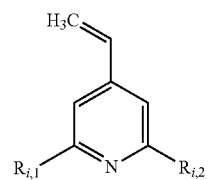

in which the definitions of $R_{i,1}$ and $R_{i,2}$ are as indicated above.

According to the present invention, the term "co-monomer" means a compound of formula

in which $B_i$ is different from a 4-vinylpyridine derivative.

According to the present invention, the term "monomer unit derived from 4-vinylpyridine" means the basic brick

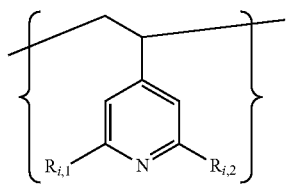

which constitutes the polymer and whose definitions of $R_{i,1}$ et $R_{i,2}$ are as indicated above.

Within the meaning of the present invention, the term "monomer unit derived from a co-monomer" means the basic brick of formula

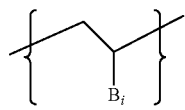

constitutes the polymer and in which $B_i$, is different from a 4-vinylpyridine derivative.

According to the present invention, the term "monomer unit" means the basic brick, constituting the polymer, composed either of a monomer unit derived from 4-vinylpyridine, or of a monomer unit derived from a co-monomer.

According to the present invention, the term "linear polymer" means a polymer in which all of the monomeric imitates are linked in a single direction forming a chain without branching or cross-linking.

According to the present invention, the term "cross-linked polymer" means a polymer in which at least two linear polymers are linked together by at least one cross-linking bridge, said cross-linking bridge being formed by a monomer unit derived from a-co-monomer belonging to at least one of the two linear polymers and said monomer unit derived from a co-monomer being covalently bonded to the carbon chain of the other linear polymer.

According to the present invention, the term "carbon chain" means the series of linear carbon formed during the polymerization by the carbon-carbon double bonds of the monomers which constitute the polymer.

According to a particular embodiment, the composition of the invention, as defined above, comprises or consists of a linear or cross-linked polymer and having one or more types of monomer units derived from 4-vinylpyridine and one or more types of monomer units derived from a co-monomer, said polymer being complexed or not with one or more different metals.

The composition according to the invention comprises or consists of a linear or cross-linked polymer consisting of monomer units, of Formula I

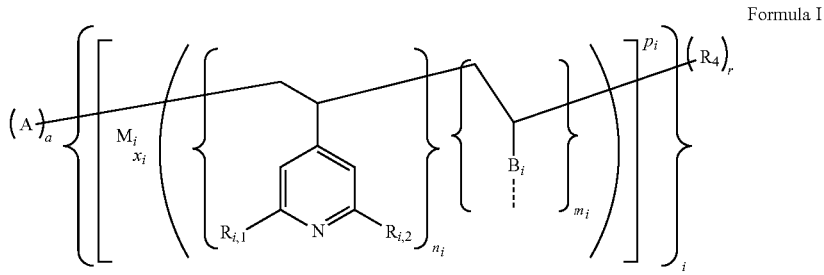

Formula I

According to the present invention, the term "alkyl radical of 1 to 20 carbons" means an acyclic carbon chain, saturated, linear or branched, comprising from 1 to 20 carbon atoms. Examples of alkyl radicals of 1 to 20 carbons include methyl-, ethyl-, propyl-, butyl groups, . . . . Within the alkyl radical, one or more hydrogens can be substituted by a group chosen from: halogen, hydroxyl, alkoxyl, amino, nitro, cyano, trilfuoro, carboxylic acid, carboxylic ester, phosphine, thiols . . . .

According to the present invention, the term "alkene radical of 2 to 20 carbons" means an acyclic carbon chain, linear or branched, comprising from 2 to 20 carbon atoms and comprising at least one carbon-carbon double bond. Examples of alkene radicals of 2 to 20 carbons include ethenyl-, propenyl-, butenyl groups . . . . Within the alkene radical, one or more hydrogens can be substituted by a group chosen from: halogen, hydroxyl, alkoxyl, amino, nitro, cyano, trilfuoro, carboxylic acid, carboxylic ester, phosphine, thiols . . . .

According to the present invention, the term "aryl radical of 2 to 20 carbons" means a carbon chain comprising at least one saturated or partially saturated ring and, comprising from 2 to 20 carbon atoms, without heteroatoms in the rings. Examples of aryl radicals of 2 to 20 carbons include phenyl-, benzyl groups, . . . . Within the aryl radical, one or more hydrogens can be substituted by a group chosen from: halogen, hydroxy, alkoxyl, amino, nitro, cyano, trifluoro, carboxylic acid, carboxylic ester, phosphine, thiols . . . .

According to the present invention, the term "heterocycle of 1 to 5 rings" means a carbon chain comprising from 1 to 5 saturated or partially saturated rings, having at least one ring which contains a different carbon atom to form the ring and comprising from 2 to 20 carbon atoms. Examples of heterocycles comprising from 2 to 20 carbons include pyrrolidinyl, piperidinyl, . . . . Within the heterocycle, one or more hydrogens can be substituted by a group chosen from: halogen, hydroxyl, alkoxyl, amino, nitro, cyano, trifluoro, carboxylic acid, carboxylic ester, phosphine, thiol . . . .

According to the present invention, the term "thiols of 1 to 20 carbon" means a carbon chain comprising from 1 to 20 carbons of formula $SR_2$.

According to the present invention, the term "phosphine from 1 to 20 carbon" means a carbon chain comprising from 1 to 20 carbons of formula $PR_3$.

in which:
$R_4$ is a compound allowing the propagation of the polymerization, whether or not originating from a polymerization initiator, or allowing the termination of the polymerization, or a transfer agent, A is a compound derived from said polymerization initiator or a fragment derived from the polymerization method, a and r are identical or different and are 0 or 1, i is a strictly positive, indexed integer, varying from 1 to n, itself comprised from 2 to 10000, and for each i:
$R_{i,1}$ and $R_{i,2}$ are substituents chosen from the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen or oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms, $B_i$ is a monomer unit derived from a co-monomer, whether or not forming a cross-linking bridge, $M_i$ is a metal, $n_i$ et $m_i$, are integers equal to 0 or 1, $n_i + m_i = 1$, $x_i$ is a number comprised from 0 to 6, $p_i$ is the electrical charge of the metal complex ranging from −6 to +6, provided that when $R_{i,1}$ (respectively $R_{i,2}$) represents either hydrogen, or an alkyl radical of 1 to 4 carbons, or an aryl radical of 1 to 4 carbons, or an alkene radical of 1 to 4 carbons, then $R_{i,2}$ (respectively $R_{i,1}$) is different from hydrogen, from the alkyl radical of 1 to 4 carbons, from the aryl radical of 1 to 4 carbons, and from the alkene radical of 1 to 4 carbons, said polymer being linear when there is no $B_i$ forming a cross-linking bridge, said polymer being cross-linked when there is at least one $B_i$, forming a cross-linking bridge between two linear polymers.

In this embodiment, the polymer of Formula I can be, for example:
- a copolymer comprising at least one type of monomer units derived from 4-vinylpyridine and at least one type of monomer units derived from a co-monomer,
- a polymer comprising at least two types of monomer units derived from 4-vinylpyridine and without monomer unit derived from a co-monomer,
- a homopolymer comprising a single type of monomer unit derived from 4-vinylpyridine, said polymer being or not being complexed with metals.

In this embodiment, the polymer of Formula I can take any form of organization of copolymers, in particular a random copolymer, a block copolymer, a periodic copolymer, or a random copolymer. These polymers can themselves be linear or cross-linked and complexed or not with metals.

In this embodiment, each monomer unit which forms the polymer of Formula I can be electrically charged, positively or negatively depending on the monomer unit and the presence or absence of a complexed metal itself charged.

In this embodiment, one of the ends of the polymer is:
- either a compound derived from a polymerization initiator such as, for example, benzene which comes from benzyl chloride,
- or the last carbon in the polymer chain, which implies a=0, and the other end of the polymer is:
- either a compound allowing the propagation of the polymerization such as for example a Chlorine atom Cl,
- or a compound allowing the termination of the polymerization,
- or a transfer agent such as, for example, benzyl benzene carbodithioate,
- or the last carbon of the polymeric chain, which implies r=0.

According to the present invention, the term "polymerization initiator" means a compound which makes it possible to initiate polymerization. The monomers which constitute react on this compound after its initiation.

According to the present invention, the term "compound permitting the propagation of the polymerization" means a compound capable of reacting with a monomer to increase the degree of polymerization of the polymer in formation by one.

According to the present invention, the term "compound allowing the termination of the polymerization" means a compound incapable of reacting with a monomer to continue the polymerization.

According to the present invention, the term "transfer agent" means a compound incapable of reacting alone with a monomer to continue the polymerization, but which can be activated by a radical compound of the reaction medium and become a compound allowing the propagation of polymerization.

According to a particular embodiment, the composition of the invention, as defined above, comprises or consists of a polymer having one or more types of monomer units derived from 4-vinylpyridine and one or more types monomer units derived from a co-monomer, said polymer being complexed or not with one or more different metals, being linear and not cross-linked.

The composition according to the invention comprises or consists of a non-cross-linked linear polymer consisting of monomer unit, of Formula II

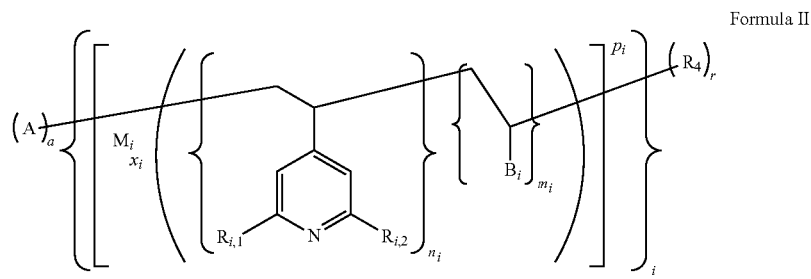

Formula II in which:
- the definitions of $R_{i,1}$, $R_{i,2}$, A, $R_4$, a, r, $M_i$, $x_i$, $n_i$, $m_i$, $p_i$ and i are as described in Formula I,
- $B_i$ is a monomer unit derived from a co-monomer which does not form a cross-linking bridge.

In this embodiment, no monomer unit forms a cross-linking bridge with another monomer.

In this embodiment, the absence of cross-linking makes it possible to increase the solubility of the polymers.

According to a particular embodiment, the composition of the invention, as defined above, comprises or consists of a polymer having one or more types of monomer units derived from 4-vinylpyridine and having no monomer units derived from a co-monomer, said polymer is complexed or not with one or more different metals, is linear and is not cross-linked.

The composition according to the invention comprises or consists of a polymer of Formula III

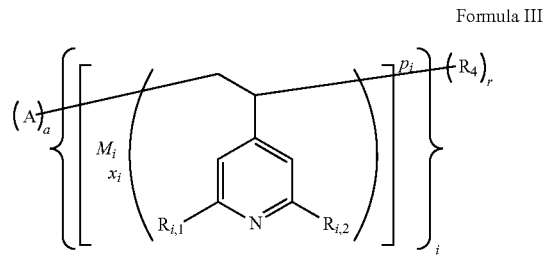

Formula III in which:
- the definitions of $R_{i,1}$, $R_{i,2}$, A, $R_4$, a, r, $M_i$, $x_i$, $p_i$ and i are as described in Formula I.

In this embodiment, the polymer of Formula III can be:
- a polymer with at least two types of monomer units derived from 4-vinylpyridine and without monomer unit derived from a co-monomer, or
- a homopolymer.

In this embodiment, the absence of co-monomer makes it possible to increase the capacity for capture of metals by the polymer. If 100% of the monomer units are monomer units derived from 4-vinylpyridine, the two substituent groups of which in positions 2 and 6 are carboxylic acid groups, the capacity for complexing with the metal is doubled, compared with the capacity for complexing d a polymer containing 50% of monomer units derived from co-monomers.

In this embodiment, the possibility of having several monomer units derived from 4-vinylpyridine makes it possible to complex different metals according to the monomer units or to complex the same metal differently according to the monomer units. These differences make it possible to obtain different catalytic sites on the same polymer and thus to carry out catalytic reactions requiring several different catalytic sites with a single catalyst.

According to a particular embodiment, the composition of the invention, as defined above, comprises or consists of a polymer having a single type of monomer units derived from 4-vinylpyridine and having no units monomers derived from a co-monomer, said polymer being complexed or not with one or more different metals, being linear and not cross-linked.

The composition according to the invention comprises or consists of a homopolymer of Formula IV

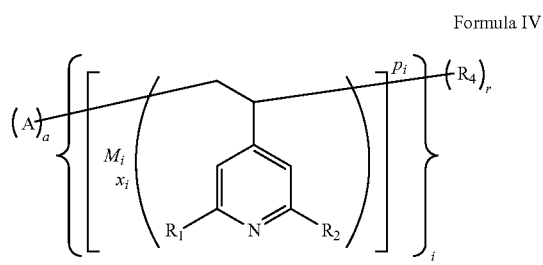

Formula IV in which:
the definitions of A, $R_4$, a, r, $M_i$, $x_i$, $p_i$ and i are as described in Formula I,
$R_1$ et $R_2$ are substituents chosen from the following group: hydrogen, alkyl radical of 1 to 20 carbons, alkene radical of 1 to 20 carbons, aryl radical of 1 to 20 carbons, carboxylic acid with 1 to 20 carbons, alcohol of 1 to 20 carbons, ether with 1 to 20 carbons, ester of 1 to 20 carbons, amine with 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms,
provided that when $R_1$ represents either hydrogen or an alkyl radical of 1 to 4 carbons, or an aryl radical of 1 to 4 carbons, or an alkene radical of 1 to 4 carbons, then 2 is different from hydrogen, of the alkyl radical of 1 to 4 carbons, of the aryl radical of 1 to 4 carbons, and of the alkene radical of 1 to 4 carbons.

In this embodiment, the polymer of Formula IV is a homopolymer.

In this embodiment, the polymer can be optimized for a single action.

For example, the polymer comprising only monomer units derived from 4-vinylpyridine, the two substituent groups of which in positions 2 and 6 are carboxylic acid groups, exhibit optimal activity for the capture of uranyl ions in aqueous solution.

According to a particular embodiment, the composition of the invention, as defined above, comprises or consists of a polymer having a single type of monomer units derived from 4-vinylpyridine, of which the two substituent groups are positions 2 and 6 are carboxylic acid groups, and having no monomer units derived from a co-monomer, said polymer being complexed or not with a single metal, being linear and not cross-linked.

The composition according to the invention comprises or consists of a homopolymer of chelidamic acid of Formula V

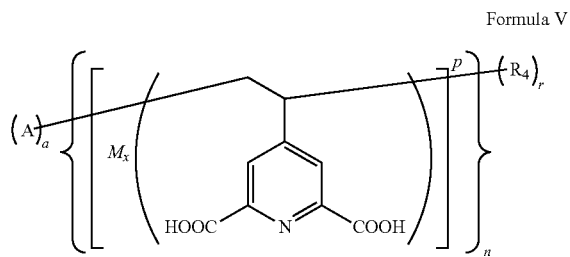

Formula V in which:
the definitions of $R_4$, A, a, and r are as described in the general formula,
M is a metal,
x is a number comprised from 0 to 6,
p is the electrical charge of the metal complex ranging from −6 to +6.

In this embodiment, the polymer of Formula V is a homopolymer with a single type of monomer units derived from 4-vinylpyridine, the two substituent groups in positions 2 and 6 of which are carboxylic acid groups.

In this embodiment, the constituent monomer units of the polymer of Formula V are either all complexed with the same metal, or all not complexed.

In this embodiment, the constituent monomer units of the polymer of Formula V all have the same electrical charge.

In this embodiment, the polymers of Formula V have the advantage of being able to dissolve easily in an aqueous medium, with a solubility dependent on the pH conditions of the medium and with an ability to complex with the metals optionally present in the solution.

According to another particular embodiment, the composition of the invention, as defined above, comprises or consists of a polymer having a single type of monomer units derived from 4-vinylpyridine, the two substituent groups of which positions 2 and 6 are carboxylic acid groups and having no monomer units derived from a co-monomer, said polymer not being complexed by a metal, being linear and not cross-linked.

The composition according to the invention comprises or consists of a homopolymer of chelidamic acid of Formula VI

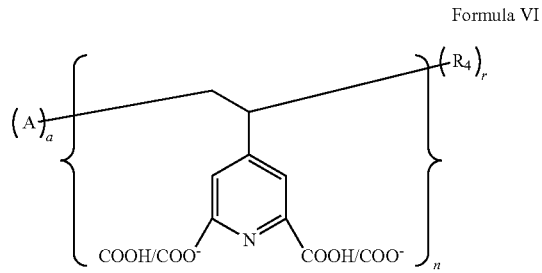

Formula VI in which:
the definitions of $R_4$, A, a, and r are as described in Formula I,
in particular the polymers of Formula VII, Formula VIII, Formula IX, Formula X, and Formula XI between $n_1$, $n_2$ and $n_3$ for the polymers of Formula VIII, Formula IX and Formula X, has an impact on the overall charge of the polymer, the capacity of the polymer to dissolve, as well as the capacity of the polymer for complexing metals.

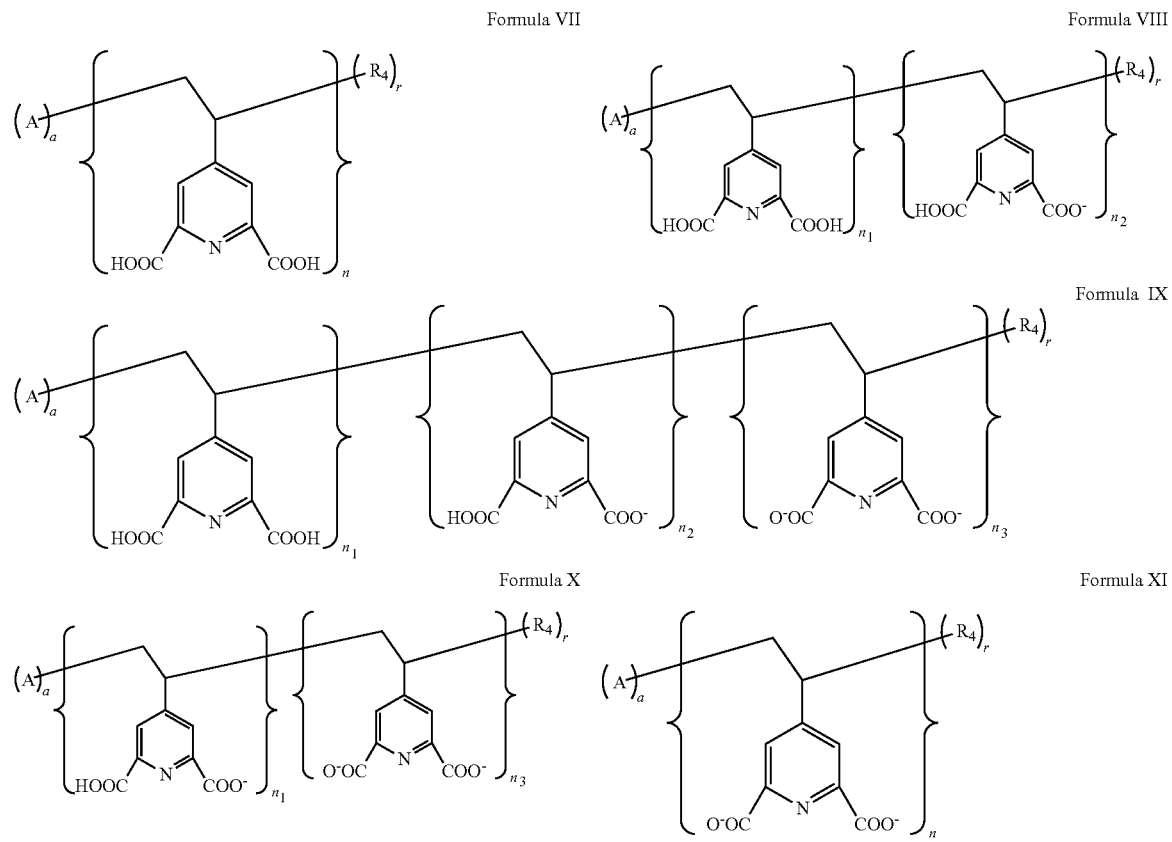

in which:
the definitions of $R_4$, A, a, and r are as described in Formula I,
$n_1$, $n_2$ and $n_3$ are integers,
in Formula VIII, $n_1+n_2=n$,
in Formula IX, $n_1+n_2+n_3=n$,
in Formula X, $n_1+n_3=n$.

In this embodiment, the polymer of Formula VI is a homopolymer comprising a single type of monomer units derived from 4-vinylpyridine, the two substituent groups in positions 2 and 6 of which are carboxylic acid groups, not complexed with a metal.

In this embodiment, the polymer of Formula VI varies depending on the pH of the solution in which the polymer is found. The polymer of Formula VI thus has one of the following formulas:
in very acidic medium: the polymer of Formula VII,
by slightly increasing the pH: the polymer of Formula VIII,
by continuing to increase the pH: the polymer of Formula IX,
by continuing to increase the pH: the polymer of Formula X,
in neutral and basic medium: the polymer of Formula XI.

In this embodiment, the ratio $n_1/n_2$ ratio of the polymer of Formula VIII; the $n_1/n_2$ and $n_1/n_3$ ratios of the polymer of Formula IX and the $n_1/n_3$ ratio of the polymer of Formula X depend on the pH of the solution. The variation in the ratios According to another particular embodiment, the composition of the invention, as defined above, comprises or consists of a polymer having a single type of monomer units derived from 4-vinylpyridine, of which the two substituent groups in positions 2 and 6 are methyl ester groups, and having no monomer units derived from a co-monomer, said polymer not being complexed by a metal, being linear and not cross-linked.

The composition according to the invention comprises or consists of a homopolymer of Formula XII Formula XII

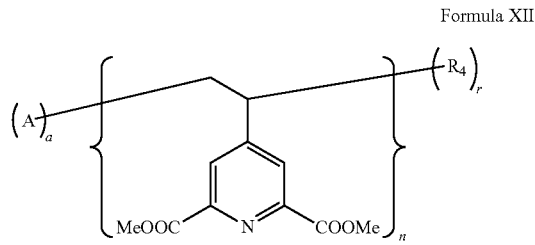

in which:
the definitions of A, $R_4$, r, and a are as described in Formula I.

In this embodiment, the polymer of Formula XII is a homopolymer with a single type of monomer units derived from 4-vinylpyridine, the two substituent groups in positions 2 and 6 of which are methyl ester groups.

In this embodiment, no monomer unit constituting the polymer of Formula XII is complexed with a metal.

In this embodiment, the polymer thus obtained is soluble in organic solution such as DMSO and acetonitrile. This property allows easier polymerization of the monomer derived from 4-vinylpyridine, the two substituent groups in positions 2 and 6 of which are methyl ester groups.

According to another particular embodiment, the composition of the invention, as defined above, comprises or consists of a polymer having a single type of monomer units derived from 4-vinylpyridine, of which the two substituent groups in positions 2 and 6 are carboxylic acid groups, and having no monomer units derived from a co-monomer, said polymer being complexed or not with uranium, being linear and not cross-linked.

The composition according to the invention comprises or consists of a homopolymer of a chelidamic acid complexed with uranium, represented by Formula XIII

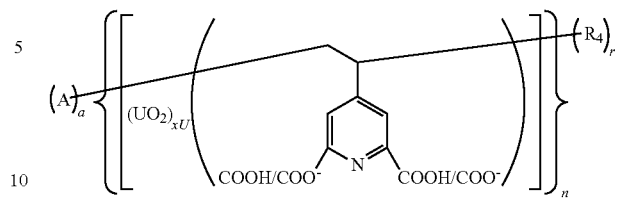

Formula XIII in which the definitions of A, $R_4$, r, a are as described in Formula I, xU is a number comprised from 0 to 1, in particular the polymers of Formula VII, Formula XIV, Formula XV, Formula XVI and Formula XVII,

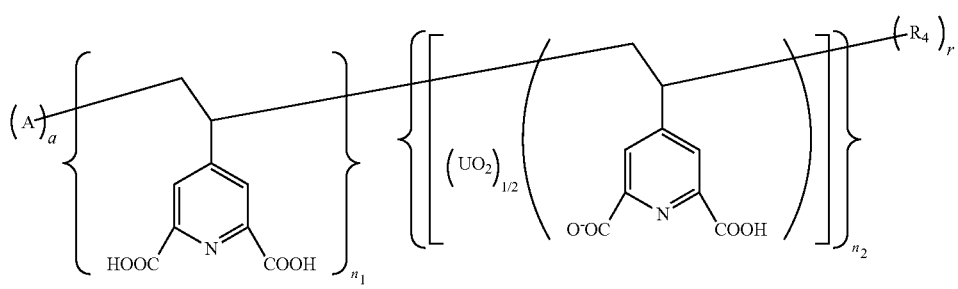

Formula XIV

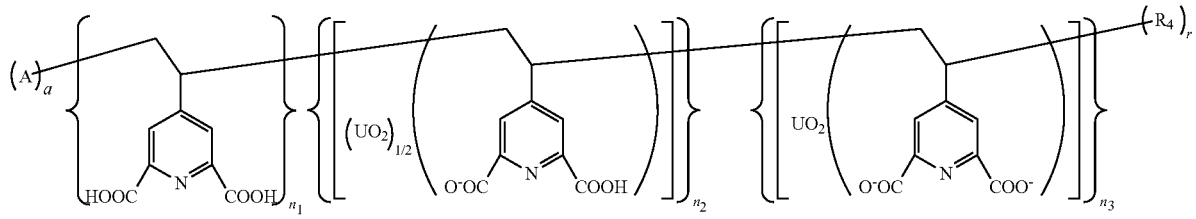

Formula XV

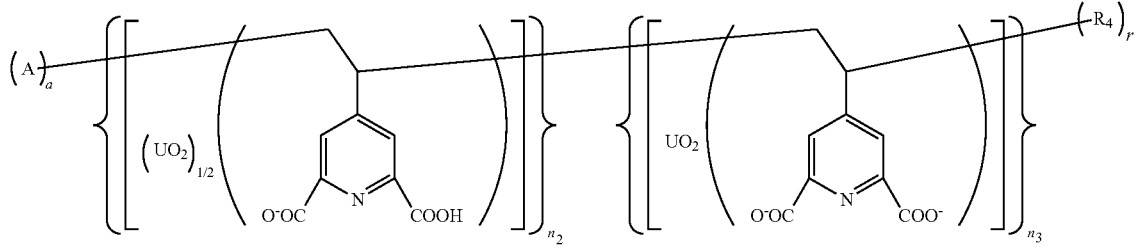

Formula XVI

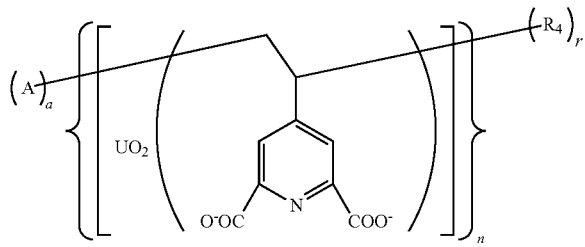

Formula XVII in which:
the definitions of $R_4$, A, a, and r are as described in Formula I,
$n_1$, $n_2$ et $n_3$ are non-zero integers,
in Formula XIV, $n_1+n_2=n$,
in Formula XV, $n_1+n_2+n_3=n$,
in Formula XVI, $n_2+n_3=n$.

In this embodiment, the polymer of Formula XIII is a homopolymer comprising a single type of monomer units derived from 4-vinylpyridine, the two substituent groups in positions 2 and 6 of which are carboxylic acid groups, and in which each unit monomer may or may not form a complex with a uranyl cation.

In this embodiment, the polymer of Formula XIII varies depending on the pH of the solution in which the polymer is found. The polymer of Formula XIII thus has one of the following formulas
in very acidic medium: the polymer of Formula VII,
by slightly increasing the pH: the polymer of Formula XIV,
continuing to increase the pH: the polymer of Formula XV,
by continuing to increase the pH: the polymer of Formula XVI,
in neutral and basic medium: the polymer of Formula XVII.

In this embodiment, the $n_1/n_2$ ratio of the polymer of Formula XIV; the $n_1/n_2$ and $n_1/n_3$ ratios of the polymer of Formula XV and the $n_2/n_3$ ratio of the polymer of Formula XVI depend on the pH of the solution.

The variation in the ratios between $n_1$, $n_2$ and $n_3$ for polymers of Formula XIV, Formula XV and Formula XVI, has an impact on the overall charge of the polymer, the capacity of the polymer to dissolve, as well as the capacity of the polymer for complexing metals.

In this embodiment, for example, in a neutral pH solution containing uranyl ions, the polymer of Formula V dissolves and becomes a polymer of Formula XI. This polymer complexes with uranyl ions and becomes a polymer of Formula XVII which precipitates. This polymer of Formula XVII is then placed in an aqueous solution with a very acidic pH. The polymer reacts and releases uranyl ions while the polymer becomes of Formula VII. This polymer of Formula VII is no longer soluble and precipitates.

According to a particular embodiment, the composition of the invention, as defined above, comprises or consists of a copolymer with at least one monomer unit derived from a co-monomer, in particular monomer units derived from styrene, acrylic acid or tert-butyl acrylate.

In this embodiment, the polymer contains at least one monomer unit derived from a co-monomer and in particular, this co-monomer is either styrene or acrylic acid.

In this embodiment, the co-monomers can act:
as a spacer by reducing the steric hindrance around the monomer units derived from 4-vinylpyridine which can allow easier access of metals to the complexing sites, or
as an agent for modifying the properties of the polymer, in particular radiation resistance or thermal resistance.

According to a particular embodiment, the composition of the invention, as defined above, comprises or consists of a copolymer in which the level of monomer unit derived from a co-monomer varies from a value strictly greater than 0% to a value less than 80%.

In this embodiment, the polymer contains at least one monomer unit derived from a co-monomer, but the proportion of monomer units derived from a co-monomer can take all the values from a value strictly greater than 0 up to 80%, in particular from a value strictly greater than 0 to 10%, from a value strictly greater than 0 to 20%, from a value strictly greater than 0 to 30%, from a value strictly greater than 0 to 40%, from a value strictly greater than 0 to 50%, from a value strictly greater than 0 to 60%, from a value strictly greater than 0 to 70% or from a value strictly greater than 0 to 80%.

According to a particular embodiment, the composition of the invention, as defined above, comprises or consists of a polymer having a single type of monomer units derived from 4-vinylpyridine and a single type of unit monomers derived from a co-monomer, said polymer not being complexed by a metal, being linear, being non-cross-linked, and being polymerized by blocks.

The composition according to the invention comprises or consists of a block copolymer of Formula XVIII,

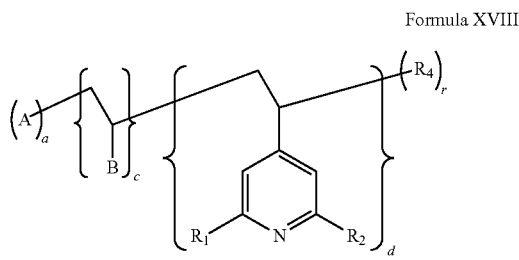

Formula XVIII in which:
the definitions of A, $R_4$, a and r, are as described in Formula I,
the definitions of $R_1$ and $R_2$ are as described in Formula IV,
B is a monomer unit derived from a co-monomer which does not form a cross-linking bridge,
d is the degree of polymerization of the block consisting of the monomer units derived from 4-vinylpyridine and a is an integer,
c is the degree of polymerization of the block consisting of the monomer units derived from the co-monomer and b is an integer,
$c+d=n$.

According to the present invention, the term "block copolymer" means a polymer in which at least one monomer unit is derived from a co-monomer and in which the monomer units of identical formula are linked to one another.

In this embodiment, the polymer is polymerized in the form of blocks, with a first block containing all the monomer units derived from a co-monomer, and a second block containing all the monomer units derived from 4-vinylpyridine.

In this embodiment, the polymer has the characteristics and properties of each block. For example if the first block consists of a hydrophobic polymer and the second block of a hydrophilic polymer, the overall polymer forms micelles.

According to another particular embodiment, the composition of the invention, as defined above, comprises or consists of:
either of a polymer having a single type of monomer units derived from 4-vinylpyridine, the two substituent groups in positions 2 and 6 of which are methyl ester groups, and a single type of monomer units derived from a co monomer, styrene, said polymer being not complexed by a metal, being linear, being non-cross-linked, and is block polymerized, or of a polymer having a single type of monomer units derived from 4-vinylpyridine, the two substituent groups of which in positions 2 and 6 are carboxylic acid groups, and a single type of monomer units derived from a co monomer, styrene, said polymer being not complexed by a metal, being linear, being non-cross-linked, and is block polymerized.

The composition according to the invention comprises or consists of a two-block copolymer of Formula XIX a and b,

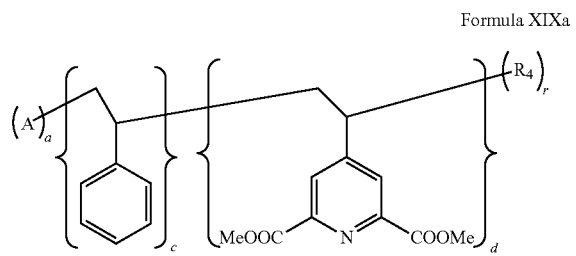

Formula XIXa units derived from styrene, and a second block containing all the monomer units derived from 4-vinylpyridine.

In this embodiment, the polymer of Formula XIX b, is insoluble in an aqueous medium. The block consisting of monomer units derived from styrene is hydrophobic. The block consisting of monomer units derived from 4-vinylpyridine, the two substituent groups in positions 2 and 6 of which are carboxylic acid groups, is hydrophilic. The polymer of Formula XIX b can form micelles.

According to a particular embodiment, the composition of the invention, as defined above, comprises or consists of a copolymer having one or more types of monomer units derived from 4-vinylpyridine and one or more types monomer units derived from a co-monomer, said polymer being complexed or not with one or more different metals, being non-linear and being cross-linked with at least one other polymer.

The composition according to the invention comprises or consists of a cross-linked copolymer, said copolymer being of Formula XX,

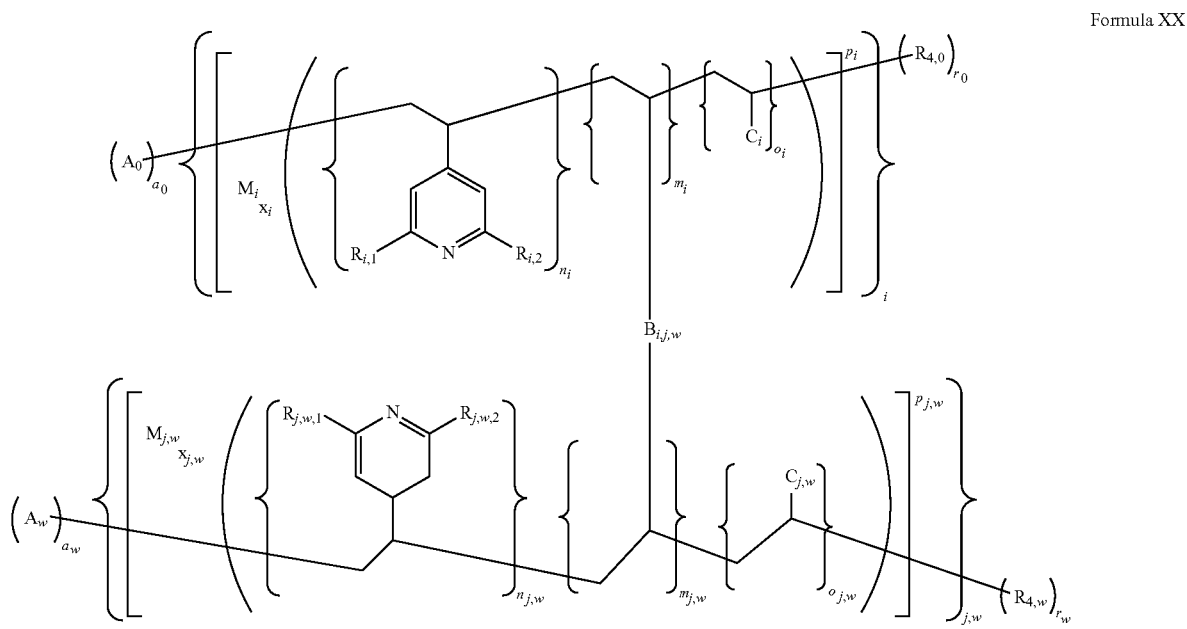

Formula XX

-continued

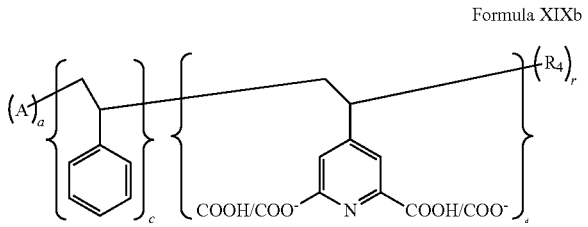

Formula XIXb in which:
The definitions of A, $R_4$, a, c, d and r are as described in Formula XVIII In this embodiment, the polymer is polymerized in the form of blocks, with a first block containing only monomer in which:
W is a strictly positive, indexed integer varying from 1 to the number of polymers cross-linked with the polymer of index 0, itself comprised from 1 to 1000, $A_0$ and $A_w$ are compounds derived from polymerization initiators, $R_{4,0}$ and $R_{4,w}$ are compounds allowing the propagation of the polymerization, whether or not originating from said polymerization initiator, or allowing the termination of the polymerization, or a transfer agent, $a_0$, $r_0$, $a_w$ and $r_w$ are identical or different and are 0 or 1, i and j, w are integers which are strictly positive, indexed, varying respectively from 1 to $n_i$ and 1 to $n_{j,w}$, $n_i$ and $n_{j,w}$ being comprised from 1 to 9999, $n_i+n_{j,w}=n$, n being comprised from 3 to 10000, and for each i and each j, w:

$R_{i,1}$, $R_{i,2}$, $R_{j,w,1}$ and $R_{j,w,2}$ are substituents chosen from the following group: hydrogen, alkyl radical of 1 to 20 carbons, alkene radical of 1 to 20 carbons, aryl radical of 1 to 20 carbons, carboxylic acid of 1 to 20 carbons, alcohol of 1 to 20 carbons, ether of 1 to 20 carbons, ester from 1 to 20 carbons, amino of 1 to 20 carbons, heterocycle of 1 to 5 rings of which the heteroatom is either nitrogen, or oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms, provided that when $R_{i,1}$ (respectively $R_{i,2}$) represents either hydrogen, or an alkyl radical of 1 to 4 carbons, or an aryl radical of 1 to 4 carbons, or an alkene radical of 1 to 4 carbons, then $R_{i,2}$ (respectively $R_{i,1}$) is different from hydrogen, from the alkyl radical of 1 to 4 carbons, from radical aryl of 1 to 4 carbons, and of the alkene radical of 1 to 4 carbons, provided that when $R_{j,w,1}$ (respectively $R_{j,w,2}$) represents either hydrogen, or an alkyl radical of 1 to 4 carbons, or an aryl radical of 1 to 4 carbons, or an alkene radical of 1 to 4 carbons, then $R_{j,w,2}$ (respectively $R_{j,w,1}$) is different from hydrogen, of the alkyl radical of 1 to 4 carbons, of the aryl radical of 1 to 4 carbons, and the alkene radical of 1 to 4 carbons, $B_{i,j,w}$ is a monomer unit derived from a co-monomer, forming a cross-linking bridge between the polymer 0 in position i and the polymer of index w in position j, $C_i$ and $C_{j,w}$ are monomer units derived from a co-monomer which does not form a cross-linking bridge, $n_i$, $m_i$, $o_i$, $n_{j,w}$, $m_{j,w}$, and $o_{j,w}$ are integers equal to 0 or 1, $n_i + m_i + o_i = 1$, $n_{j,w} + m_{j,w} + o_{j,w} = 1$, the sum of the $o_{j,w}$ is non-zero and the sum of the $o_i$ is non-zero.

In this embodiment, the polymer of Formula XX is a cross-linked copolymer in which the crosslink bridges are formed only on monomer units derived from a co-monomer.

In this embodiment, the polymer of Formula XX may contain monomer units derived from a co-monomer which does not form a cross-linking bridge.

In this embodiment, the cross-linked polymers are capable of reinforcing the structure of the particles formed by weaving a three-dimensional network at the heart of the particle.

In this embodiment, the polymer can form a hydrogel.

According to a particular embodiment, the composition of the invention, as defined above, comprises or consists of a copolymer having a single type of monomer units derived from 4-vinylpyridine, of which the two substituent groups are positions 2 and 6 are carboxylic acid groups, and a single type of monomer unit derived from a co-monomer, 1,4-divinylbenzene, said polymer being not complexed by a metal, being nonlinear and being cross-linked with at minus another polymer.

The composition according to the invention comprises or consists of a cross-linked copolymer, said copolymer being of Formula XXI,

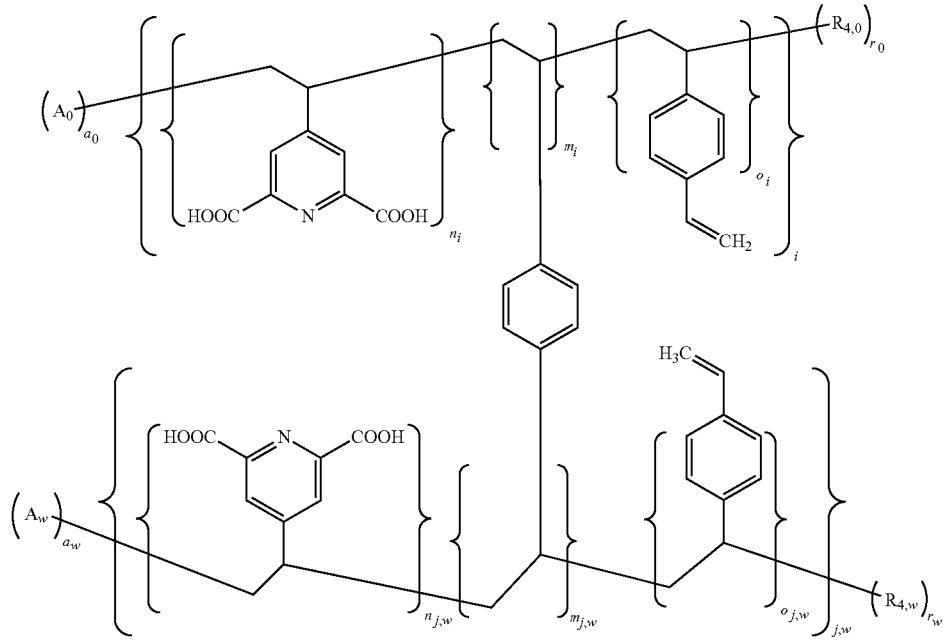

Formula XXI in which:

the definitions of w, $A_0$, $A_w$, $a_0$, $a_w$, i, j, w, $n_i$, $n_{j,w}$, $m_i$, $m_{j,w}$, $o_i$, $o_{j,w}$, $R_{4,0}$, $R_{4,w}$, $r_0$ and $r_w$ are as defined in Formula XX.

In this embodiment, the polymer of Formula XXI is a cross-linked copolymer comprising a single type of monomer units derived from 4-vinylpyridine, the two substituent groups in positions 2 and 6 of which are carboxylic acid groups, and comprising only one type of monomer units derived from a co-monomer, 1,4-divinylbenzene.

In this embodiment, the monomer units derived from 1,4-divinylbenzene of the polymer of Formula XXI may or may not form a cross-linking bridge. At least one cross-linking bridge is formed in the polymer of Formula XXI.

According to a particular embodiment, the composition of the invention, as defined above, comprises or consists of a polymer in which said polymer is complexed with a metal.

In this embodiment, the polymer is complexed with at least one metal atom, in particular for its use as a chelating agent or as a catalyst.

According to a particular embodiment, the composition of the invention, as defined above, comprises or consists of a polymer in which said polymer is complexed with a metal chosen from actinides, lanthanides or transition metals.

In this embodiment, the polymer is complexed to a particular family of metals.

According to a particular embodiment, the composition of the invention, as defined above, comprises or consists of a polymer in which said polymer is complexed with uranium.

In this embodiment, the polymer is complexed only with uranium. This polymer is useful for recovering uranium from seawater or used nuclear fuel. It also allows the preparation of uranium-based catalysts to catalyze reactions such as the degradation of volatile organic compounds in the gas phase or the oxidation of methane to methanol.

According to a particular embodiment, the composition of the invention, as defined above, comprises or consists of a polymer soluble in aqueous solution and in particular in sea water.

In this embodiment, the polymer is soluble in aqueous solutions and more particularly in sea water. This is in particular the case for the homopolymer with a monomer unit derived from 4-vinylpyridine, the two substituent groups in positions 2 and 6 of which are carboxylic acid groups. The carboxylic acid groups facilitate the solubilization of the polymer under neutral or basic pH conditions, as is the case in seawater.

According to a particular embodiment, the composition of the invention, as defined above, comprises or consists of a polymer complexed with a metal which is soluble or insoluble in aqueous solution.

In this embodiment, the polymer can be soluble or insoluble depending on the conditions in which the polymer is found, when the polymer is complexed with a metal. This is particularly the case for the polymer of Formula XIII. This polymer, complexed with uranium, is insoluble at neutral pH and again becomes soluble complexed with uranium in aqueous solution at acidic pH.

According to a particular embodiment, the composition of the invention, as defined above, comprises or consists of a polymer soluble in aqueous solution not complexed with a metal and insoluble in solution complexed with a metal, in particular with uranium.

In this embodiment, the polymer is soluble in an aqueous solution and the polymer precipitates along with the metal when the polymer and the metal complex. This is particularly the case for the polymer of Formula VI, which is soluble in water at neutral pH and which, once complexed with uranium, gives Formula XIII, and precipitates at neutral pH.

According to a particular embodiment, the composition of the invention, as defined above, comprises or consists of a polymer soluble in organic solvents, in particular acetonitrile, and dimethyl sulfoxide (DMSO).

In this embodiment, the polymer is soluble in an organic solution such as acetonitrile, this is in particular the case for the homopolymer comprising a monomer unit derived from 4-vinylpyridine, of which the two substituent groups in position 2 and 6 are methyl ester groups.

According to a particular embodiment, the composition of the invention, as defined above, comprises or consists of a polymer in which A, $A_0$ and $A_w$ are derived from a polymerization initiator chosen from 4-(chloromethyl)-benzoyl chloride, benzyl chloride, AIBN, methyl-2-bromo-2-methylpropanoate.

In this embodiment, the first end of the polymer cannot be the last carbon in the polymeric chain. The above list is not exhaustive and includes all of the polymerization initiators which can be used in radical polymerizations.

According to a particular embodiment, the composition of the invention, as defined above, comprises or consists of a polymer in which $R_4$, $R_{4,0}$ and $R_{4,w}$ are chosen from a chlorine atom, or the compounds of Formula XXII Formula XXII

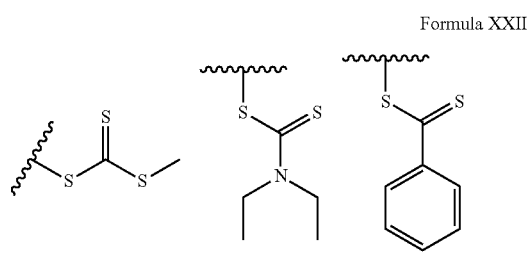

In this embodiment, the second end of the polymer cannot be the last carbon in the polymer chain. The list is not exhaustive and includes all of the transfer agents which can be used in so-called controlled radical polymerizations.

According to a particular embodiment, the composition of the invention, as defined above, comprises or consists of a polymer of Formula XXIII.

Formula XXIII

In this embodiment, the polymer of Formula XXHI is a homopolymer consisting of monomer units derived from 4-vinylpyridine and substituted by two carboxylic acid groups. The initiator chosen is benzyl chloride which splits into two parts to give a benzyl end and a chlorine end at the other end of the chain.

The present invention further relates to a method for the preparation of a polymer, as defined above, comprising the following preparation steps:
  A radical polymerization step starting with the initiation of a polymerization initiator to obtain an initiated polymerization initiator followed by the contacting of said initiated polymerization initiator with,
  at least one monomer derived from 4-vinylpyridine in which the carbons in position 2 and 6 can be substituted by one of the substituents of the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms,
and optionally with at least a co-monomer,
with or without cross-linking,
to obtain a polymer,
  optionally a modification step by bringing said polymer into contact with a reagent to modify at least one of the above substituents in position 2 and/or 6, in order to obtain a optionally modified polymer,
  optionally a complexation step by bringing said optionally modified polymer into contact with a metal to obtain an optionally modified and optionally complexed polymer.

According to the present invention, the term "radical polymerization" means the polymerization techniques which make it possible to polymerize monomers and the propagation of which is ensured by the presence of a radical. These techniques include so-called classical radical polymerization, reversible addition-fragmentation chain transfer polymerization (RAFT), nitroxide polymerization (NMP), atomic transfer radical polymerization (ATRP), polymerization radical by atom transfer by additional activator and reducing agent (SARA ATRP).

The method of synthesis of polymers according to the present invention has the advantage of being able to carry out the polymerization step in a solution in which the monomers which form the monomer units are insoluble. The presence of the modification step makes it possible to polymerize monomers having groups in positions 2 and 6 different from the final groups. For example, the monomer derived from 4-vinylpyridine, the two substituent groups of which in positions 2 and 6 are carboxylic acid groups, is insoluble in organic solution. It is therefore very difficult to polymerize this monomer in organic solution. On the other hand, the monomer derived from 4-vinylpyridine, the two substituent groups of which in positions 2 and 6 are methyl ester groups, is soluble in organic medium. The polymerization of the monomer derived from 4-vinylpyridine, in which the two substituent groups in position 2 and 6 are methyl ester groups, is then possible and the following modification step makes it possible to hydrolyze the ester function into an acid function. The polymer thus obtained, with the acid functions, is insoluble in organic medium.

The polymer synthesis method according to the present invention has the advantage of being able to easily control the polymerization step. The presence of the modification step is a solution to protect the two groups of monomers derived from 4-vinylpyridine. In fact, if the desired groups are very reactive (COOH, $NH_2$, etc.) the risk of these groups reacting during the polymerization stage is significant. This can lead to the formation of uncontrolled ramifications and/or the loss of certain grouping. The post-polymerization modification stage makes it possible to start the polymerization with protective groups which will subsequently be removed during the modification stage. The choice in addition of a controllable radical polymerization method such as RAFT or ATRP polymerization further improves control over the polymerization.

The method for the synthesis of the polymers according to the present invention can comprise an additional stage of preparation of the monomers derived from 4-vinylpyridine.

According to the present invention, the term "initiation of a polymerization initiator" is understood to mean the step enabling the polymerization to be initialized. For example in the case of radical polymerization, this step makes it possible, by physical or chemical means, to create a radical on the polymerization initiator on which a monomer unit will react.

According to a particular embodiment, the method for the preparation, as defined above, of a polymer of the invention of Formula I

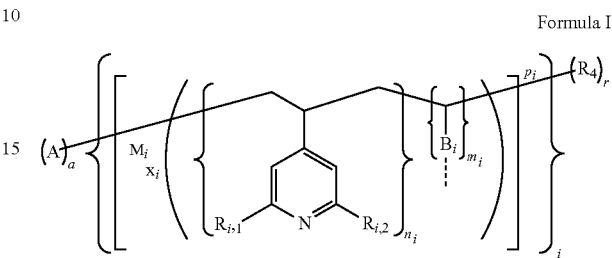

Formula I in which:
  $R_4$ is a compound allowing the propagation of the polymerization, whether or not originating from a polymerization initiator, or allowing the termination of the polymerization, or a transfer agent,
  A is a compound derived from said polymerization initiator or a fragment derived from the polymerization method,
  a and r are identical or different and are 0 or 1,
  i is a strictly positive, indexed integer, varying from 1 to n, itself comprised from 2 to 10000,
and for each i:
  $R_{i,1}$ and $R_{i,2}$ are substituents chosen from the following group: hydrogen, alkyl radical of 1 to 20 carbons, alkene radical of 1 to 20 carbons, aryl radical of 1 to 20 carbons, carboxylic acid of 1 to 20 carbons, alcohol from 1 to 20 carbons, ether from 1 to 20 carbons, ester from 1 to 20 carbons, amino from 1 to 20 carbons, heterocycle from 1 to 5 rings in which the heteroatom is either nitrogen or oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms,
  $B_i$ is a monomer unit derived from a co-monomer, whether or not forming a cross-linking bridge,
  $M_i$ is a metal,
  $n_i$ et $m_i$ are integers equal to 0 or 1,
  $n_i+m_i=1$,
  $x_i$ is a number comprised from 0 to 6,
  $p_i$ is the electrical charge of the metal complex ranging from −6 to +6,
provided that when $R_{i,1}$ (respectively $R_{i,2}$) represents either hydrogen, or an alkyl radical of 1 to 4 carbons, or an aryl radical of 1 to 4 carbons, or an alkene radical of 1 to 4 carbons, then $R_{i,2}$ (respectively $R_{i,1}$) is different from hydrogen, from the alkyl radical of 1 to 4 carbons, from the aryl radical of 1 to 4 carbons, and from the alkene radical of 1 to 4 carbons,
said polymer being linear when it does not there is no $B_i$, forming a cross-linking bridge,
said polymer being cross-linked when there is at least one $B_i$, belonging to two different polymers of formula I,
includes:
  a radical polymerization step starting with the initiation of a polymerization initiator then continuing with the contacting of said initiated polymerization initiator with a 4-vinylpyridine derivative of Formula XXIV,

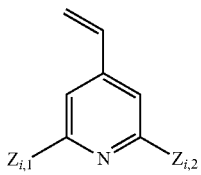

Formula XXIV in which:

$Z_{i,1}$ and $Z_{i,2}$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms, with optionally at least one co-monomer,
with or without cross-linking bridge,
to obtain the polymer of Formula XXV

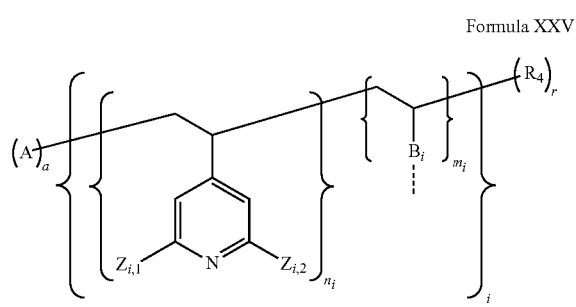

Formula XXV optionally a modification step when at least one of $Z_{i,1}$ is different from $R_{i,1}$ or when at least one of $Z_{i,2}$ is different from $R_{i,2}$ of said polymer of Formula XXV with a reagent containing a hydroxide anion, carbonate or phosphate, to obtain the polymer of Formula XXVI

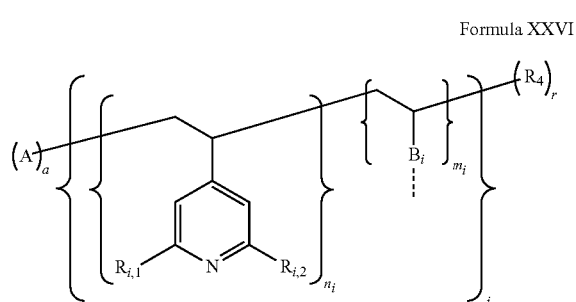

Formula XXVI optionally a complexation step of said polymer of Formula XXVI with at least one metallic compound to obtain the polymer of Formula I.

In this embodiment, the method for synthesizing the polymer of Formula I begins with the radical polymerization of the monomers forming the polymer of Formula XXV. These monomers consist of co-monomers, as well as monomers derived from 4-vinylpyridine which do not necessarily have the same substituents as the monomer units derived from 4-vinylpyridine present in Formula I, as well as. During polymerization, it is possible that cross-linking bridges are formed via a co-monomer.

After polymerization and obtaining a polymer of Formula XXV, if the substituent groups of the monomer units derived from 4-vinylpyridine are different in Formula I and Formula XXV, a modification step is carried out to allow the substituent groups of Formula XXV different from those of Formula I to react and thus obtain the polymer of Formula XXVI.

If the polymer of Formula I is complexed with metals, there only remains one step of complexing the polymer of Formula XXVI to obtain the polymer of Formula I. According to a particular embodiment, the preparation method, such as defined above, of a polymer of the invention of Formula II, in which the definitions of $R_{i,1}$ and $R_{i,2}$ are as described in Formula II, comprises:

a radical polymerization step starting with the initiation of a polymerization initiator then continuing with the contacting of said initiated polymerization initiator with a 4-vinylpyridine derivative of Formula XXIV, to obtain the polymer of Formula XXVII

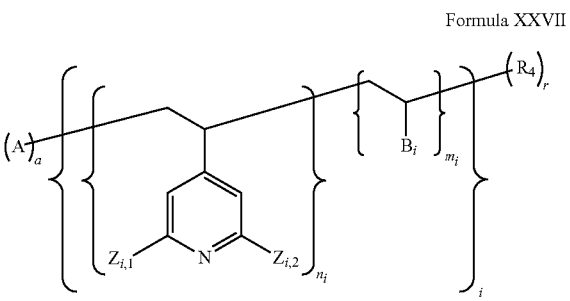

Formula XXVII in which:

the definitions of A, $R_4$, $n_i$, $m_i$, r, a and i, are as described in Formula II, the definitions of $Z_{i,1}$ and $Z_{i,2}$ are as described in Formula XXIV, $B_i$ is a monomer unit derived from a co-monomer which does not form a cross-linking bridge, a modification step, when at least one of $Z_{i,1}$ is different from $R_{i,1}$ or when at least one of $Z_{i,2}$ is different from $R_{i,2}$ of said polymer of Formula XXVII with a reagent containing a hydroxide, carbonate or phosphate anion, to obtain the polymer of Formula XXVII,

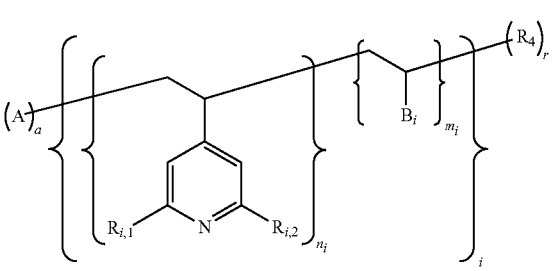

Formula XXVIII optionally a step of complexing said polymer of Formula XXVIII with at least one metal to obtain the polymer of Formula II.

In this embodiment, the method for synthesizing the polymer of Formula II begins with the radical polymerization of the monomers forming the polymer of Formula XXVII. These monomers consist of monomers derived from 4-vinylpyridine which do not necessarily have the same substituents as the monomer units derived from 4-vinylpyridine present in Formula II, as well as optionally co-monomers. The co-monomer is either chosen not to form a cross-linking bridge, or absent.

According to a particular embodiment, the method for the preparation, as defined above, of a polymer of the invention of Formula III, in which the definitions of $R_{i,1}$ and $R_{i,2}$ are as described in Formula III, includes:

a radical polymerization step starting with the initiation of a polymerization initiator then continuing with the contacting of said initiated polymerization initiator with a 4-vinylpyridine derivative of Formula XXIV, to obtain the polymer of Formula XXIX,

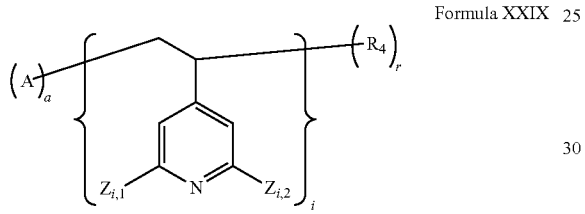

Formula XXIX in which:
the definitions of A, $R_4$, r, a and i are as described in Formula III,
the definitions of $Z_{i,1}$ and $Z_{i,2}$ are as described in Formula XXIV,
a modification step, when at least one of $Z_{i,1}$ is different from $R_{i,1}$ or when at least one of $Z_{i,2}$ is different from $R_{i,2}$ of said polymer of Formula XXIX with a reagent containing a hydroxide, carbonate or phosphate anion, to obtain the polymer of Formula XXX,

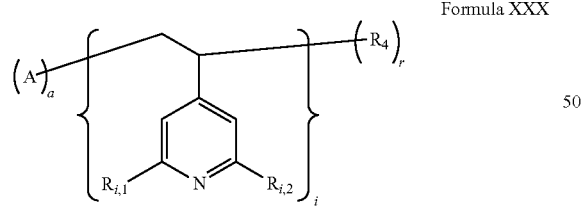

Formula XXX optionally a complexing step of said polymer of Formula XXX with at least one metal to obtain the polymer of Formula III.

In this embodiment, the method for synthesizing the polymer of Formula III begins with the radical polymerization of the monomers forming the polymer of Formula XXIX. These monomers consist of monomers derived from 4-vinylpyridine which do not necessarily have the same substituent groups as the monomer units derived from 4-vinylpyridine present in Formula III.

According to a particular embodiment, the method for the preparation, as defined above, of a polymer of the invention of Formula IV, in which the definitions of Ri and R2 are as described in Formula IV, comprises:

a radical polymerization step starting with the initiation of a polymerization initiator and then continuing with the contacting of said initiated polymerization initiator with a monomer derived from 4-vinylpyridine of Formula XXXI,

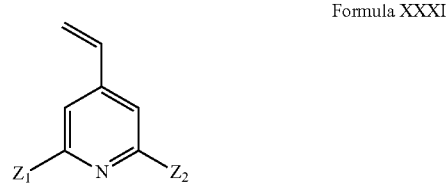

Formula XXXI in which:
$Z_1$ and $Z_2$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols from 1 to 20 carbons, phosphine from 1 to 20 carbons, the said substituents which can be cyclized with one another and which can contain sulfur or phosphorus atoms, to obtain a polymer of Formula XXXII

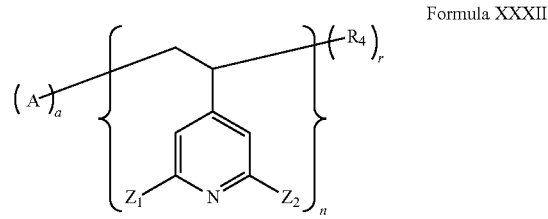

Formula XXXII in which:
the definitions of A, $R_4$, r, and a are as in Formula IV,
a step of modification, when $Z_1$ is different from $R_1$ or when $Z_2$ is different from $R_2$, of said polymer of Formula XXXII with a reagent containing a hydroxide, carbonate or phosphate anion, in order to obtain the polymer of Formula XXXIII,

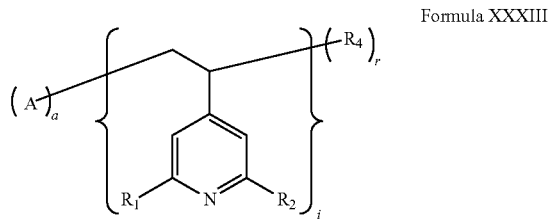

Formula XXXIII optionally a step of complexing said polymer of Formula XXXIII with at least one metal to obtain the polymer of Formula IV.

In this embodiment, the method for synthesizing the polymer of Formula IV begins with the radical polymerization of the monomers forming the polymer of Formula XXXII. These monomers are all identical to each other and consist of a monomer derived from 4-vinylpyridine which does not necessarily have the same substituent groups as the monomer units derived from 4-vinylpyridine present in Formula IV.

According to a particular embodiment, the method for the preparation, as defined above, of a polymer of the invention of Formula XVIII, in which the definitions of $R_1$ and $R_2$ are as described in Formula XVIII, comprises:
- a radical polymerization step starting with the initiation of a polymerization initiator and then continuing with the contacting of said initiated polymerization initiator with a monomer derived from 4-vinylpyridine of formula XXXI,

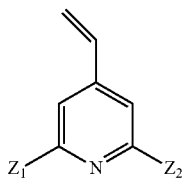
Formula XXXI in which:
$Z_1$ and $Z_2$ are substituents chosen from the following group: hydrogen, alkyl radical of 1 to 20 carbons, alkene radical of 1 to 20 carbons, aryl radical of 1 to 20 carbons, alcohol of 1 to 20 carbons, ether of 1 to 20 carbons, ester of 1 to 20 carbons, amine of 1 to 20 carbons, heterocycle of 1 to 5 rings in which the heteroatom is either nitrogen, or oxygen, or sulfur, or phosphorus, amide of 1 to 20 carbons, thiols from 1 to 20 carbons, phosphine from 1 to 20 carbons, said substituents can be cyclized with each other and can contain sulfur- or phosphorus atoms,
with a polymer of Formula XXXIV

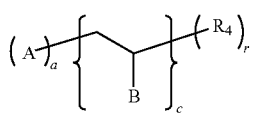
Formula XXXIV in which:
the definitions of A, $R_4$, a, and r are as described in Formula XVIII,
B is a monomer unit derived from a co-monomer which does not form a cross-linking bridge,
c is the degree of polymerization of the polymer and c is an integer strictly lower than 0.8 n,
to obtain the polymer of Formula XXXV

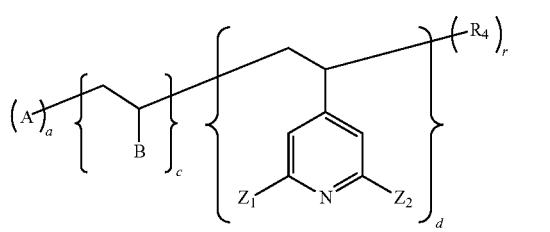
Formula XXXV in which:
d is an integer,
c+d=n,
A modification step, when $Z_1$ is different from $R_1$ or when $Z_2$ is different from $R_2$, of said polymer of Formula XXXV with a reagent containing a hydroxide, carbonate or phosphate anion, to obtain the polymer of Formula XVIII.

In this embodiment, the method for synthesizing the polymer of Formula XVIII begins with the initiation of a polymer of Formula XXXIV. This initiation makes it possible to initiate the step of radical polymerization of the monomers derived from 4-vinylpyridine. This polymerization makes it possible to form a block following the first preexisting block on the polymerization initiator used.

According to a particular embodiment, the method for the preparation, as defined above, of a polymer of the invention of Formula XVIII, comprises before the step of radical polymerization by bringing into contact a derivative monomer of 4-vinylpyridine of Formula XXXI, with a polymer of Formula XXXIV, a step of radical polymerization of a co-monomer of Formula XXXVI to obtain said polymer of Formula XXXTV,

Form XXXVI in which the definition of B is as described in Formula XVIII.

In this embodiment, the method for synthesizing the polymer of Formula XVIII begins with the polymerization of the co-monomers which allows the synthesis of the polymer of Formula XXXIV This polymer is then used as a polymerization initiator.

According to a particular embodiment, the method for the preparation, as defined above, of a polymer of the invention of Formula XX, in which the definitions of i, j,w, $R_{j,w,1}$, $R_{j,w,2}$, $R_{i,1}$ and $R_{i,2}$ are as described in Formula XX, includes:
a radical polymerization step starting with the initiation of a polymerization initiator and then continuing with the contacting of said initiated polymerization initiator with the 4-vinylpyridine derivative of Formula XXIV and of Formula XXXVII,

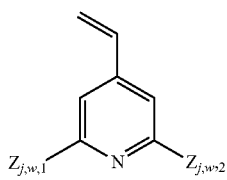
Formula XXXVII in which:
$Z_{j,w,1}$ and $Z_{j,w,2}$ are substituents chosen from the following group: hydrogen, alkyl radical of 1 to 20 carbons, alkene radical of 1 to 20 carbons, aryl radical of 1 to 20 carbons, alcohol of 1 with 20 carbons, ether with 1 to 20 carbons, ester with 1 to 20 carbons, amine with 1 to 20 carbons, heterocycle with 1 to 5 rings in which the heteroatom is either nitrogen, or oxygen, or sulfur, or phosphorus, amide of 1 to 20 carbons, thiols of 1 to 20 carbons, phosphine of 1 to 20 carbons, said substituents can be cyclized with each other and can contain sulfur- or phosphorus atoms, with at least one co-monomer, with cross-linking of at least one of the co-monomers, to obtain a polymer of Formula XXXVIII,

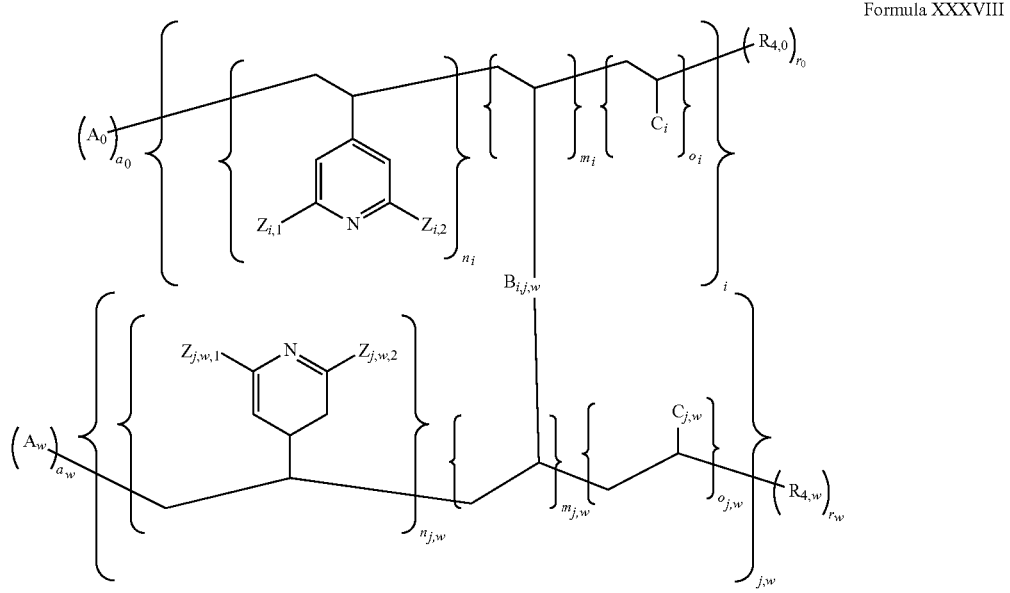

Formula XXXVIII in which:
- the definitions of w, $A_0$, $A_w$, $B_{i,j,w}$, $C_i$, $C_{j,w}$, $R_{4,0}$, $R_{4,w}$, $a_0$, $a_w$, $n_i$, $m_i$, $o_i$, $n_{j,w}$, $m_{j,w}$, $o_{j,w}$, $r_0$ and $r_w$ are as defined in Formula XX,
- the definitions of $Z_{i,1}$, $Z_{i,2}$ are as defined in Formula XXIV,
- a modification step, when at least one of the $Z_{i,1}$ is different from $R_{i,1}$ or when at least one of the is different from R, 2 or when at least one of the $Z_{i,2}$ is different from $R_{i,2}$ or when at least one of $Z_{j,w,1}$ is different from $R_{j,w,2}$ said polymer of Formula XXXVIII with a reagent to modify at least one of $Z_{i,1}$, $Z_{i,2}$, $Z_{j,w,1}$ or $Z_{j,w,2}$, said reagent containing a hydroxide, carbonate or phosphate anion, to obtain the polymer of Formula XXXIX,

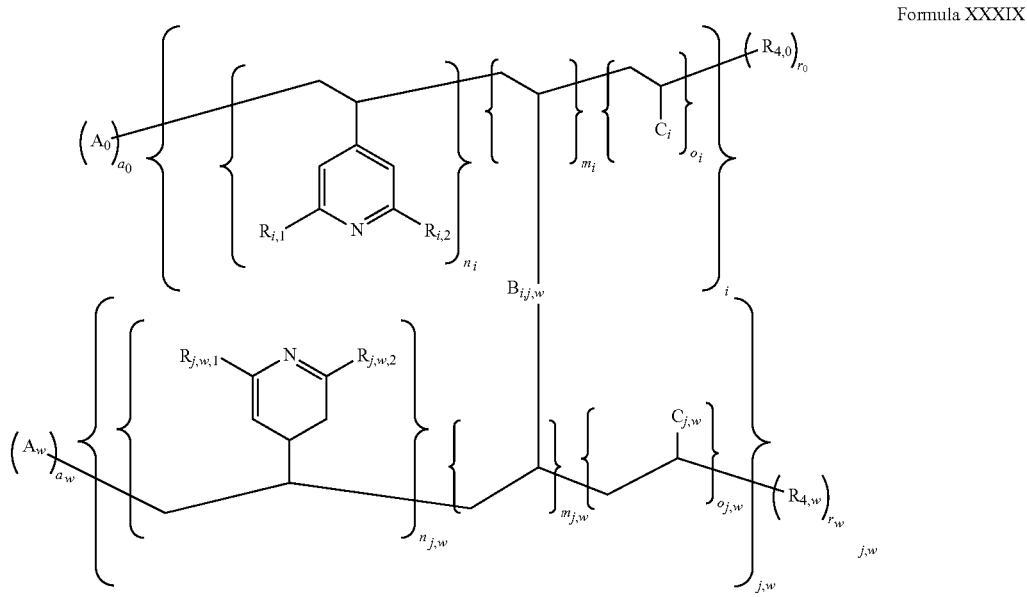

Formula XXXIX optionally a step of complexing said polymer of Formula XXXIX with at least one metal to obtain the polymer of Formula XX.

In this embodiment, the method for synthesizing the polymer of Formula XX begins with the simultaneous polymerization of all of the cross-linked polymers by bringing into contact the initiated polymerization initiators, co-monomers which will form cross-linking bridges, co-monomers which will not form a cross-linking bridge, as well as monomers derived from 4-vinylpyridine. Once the polymers have been formed and if at least one substituent is different between Formula XXXVIII and Formula XX, a modification step with, for example, a base makes it possible to obtain the polymer of Formula XXXIX. This polymer is itself complexed with a metal to obtain a polymer of Formula XX.

According to a particular embodiment, the method for preparation, as defined above, of a polymer of the invention of Formula V, comprises:
  a radical polymerization step starting with the initiation of a polymerization initiator then continuing with the contacting of said initiated polymerization initiator with 4-vinylpyridine derivative of Formula XL,

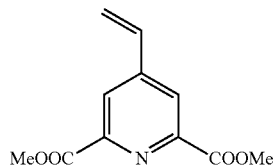

Formula XL to obtain a polymer of Formula XII,
  a step of modifying said polymer of Formula XII with a base to obtain a polymer of Formula VI,
  a step of complexing said polymer of Formula VI with a metal to obtain a polymer of Formula V.

In this embodiment, the method for synthesizing the polymer of Formula V begins with the polymerization of the monomer derived from 4-vinylpyridine with two methyl ester substituents to obtain a homopolymer of Formula XII. This polymer is then reacted with sodium hydroxide which allows the methyl hydrolysis of the methyl ester groups to obtain two carboxylic acid groups. This reaction makes it possible to obtain the polymer of Formula VI. This polymer of Formula VI is then complexed with metals to obtain a polymer of Formula V.

According to a particular embodiment, the method for the preparation, as defined above, of a polymer of the invention of Formula XIX, comprises:
  a radical polymerization step by bringing a polymer of Formula XLI into contact

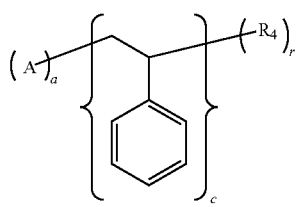

Formula XLI with 4-vinylpyridine derivative of Formula XL,
to obtain the polymer of Formula XIX.

In this embodiment, the method for synthesizing the polymer of Formula XIX begins with the initiation of a polymer of Formula XLI. This initiation makes it possible to initiate the step of radical polymerization of the monomers derived from 4-vinylpyridine. This polymerization makes it possible to form a block following the first preexisting block on the polymerization initiator used.

According to a particular embodiment, the method for the preparation, as defined above, of a polymer of the invention of Formula XX, comprises before the radical polymerization step by bringing into contact a monomer derived from the 4-vinylpyridine of Formula XL, with a polymer of Formula XLI, a step of radical polymerization of styrene to obtain said polymer of Formula XLI.

In this embodiment, the method for synthesizing the polymer of Formula XIX begins with the polymerization of the co-monomers which allows the synthesis of the polymer of Formula XLI which is then used as a polymerization initiator.

According to a particular embodiment, said radical polymerization step, as defined above, may be a polymerization of NMP, RAFT, ATRP, SARA ATRP type or a conventional radical polymerization.

According to a particular embodiment, the method for preparing a polymer of the invention of Formula XIX, comprises:
  a first reaction step by bringing a compound of Formula XLII into contact,

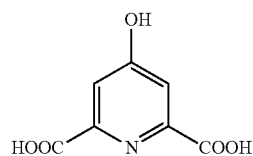

Formula XLII with PhPOCl$_2$ and methanol to synthesize the compound of Formula XLIII,

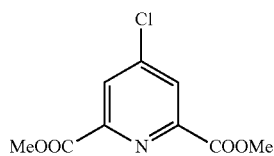

Formula XLIII a second reaction step by bringing a compound of Formula XLIII into contact with NaI, MeCN and MeCOCl to synthesize the compound of Formula XLIV,

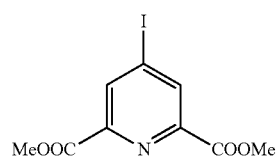

Formula XLIV a third reaction step by bringing the compound of Formula XLIV into contact with CH$_2$=CHBF$_3$K, Cs$_2$CO$_3$, PPh$_3$, and Pd(OAc)$_2$ to synthesize the compound of Formula XL

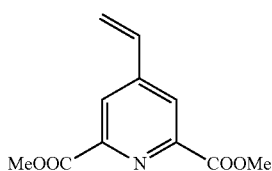

Formula XL a radical polymerization step by bringing the compound of Formula XL into contact with benzyl chloride, CuCl$_2$ and metallic copper to synthesize the polymer of Formula XLV,

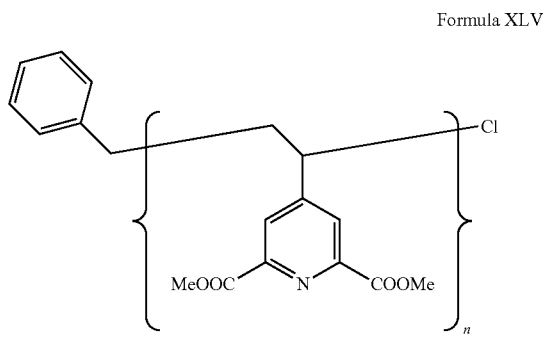

Formula XLV a fourth modification step by bringing the polymer of Formula XLV into contact with sodium hydroxide to synthesize the compound of Formula XXIII.

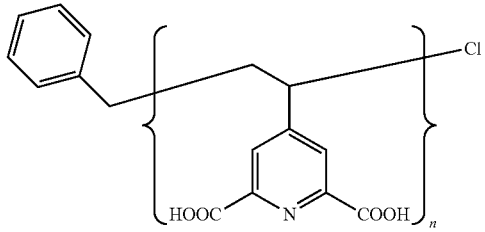

Formula XXIII

In this embodiment, the method for synthesizing the polymer of Formula XXIII begins with the synthesis of the monomer derived from 4-vinylpyridine with two methyl ester groups. This synthesis begins by replacing the alcohol function of carbon 4 of chelidamic acid with a chlorine group. During this step, the two carboxylic acid groups are modified to form methyl ester groups. Then this synthesis is continued by replacing the new chlorine function with an iodine function. This synthesis continues with the replacement of this function I by a function CH$_2$=CH—, which makes it possible to obtain the monomer of Formula XL. This monomer is then polymerized according to the SARA ATRP technique, which makes it possible to obtain a linear polymer with a controlled degree of polymerization of Formula XLV. The polymer thus obtained of Formula XLV is reacted with sodium hydroxide to obtain the polymer of Formula XXIII.

The present invention also relates to the use of the composition of the present invention chosen from the group comprising the capture of metals and their restitution, the service as a homogeneous or heterogeneous catalyst, the labeling of organic and/or inorganic surfaces, the labeling by fluorescence of biomolecules, and post-functionalization of the chelidamic ester.

According to a particular embodiment, the composition of the present invention can be used as a metal adsorbent in seawater, in particular the adsorption of actinides, more particularly the adsorption of uranium and even more particularly the adsorption selective uranium versus vanadium.

According to a particular embodiment, the composition of the present invention can be used as a treatment for effluents contaminated with metals, in particular radioactive effluents and in particular nuclear waste from nuclear power plants.

FIGURES

FIG. 1A represents a solution of uranyl nitrate at neutral pH with UO$_2$(NO$_3$)$_2$ alone. ($C_{uranyl}$=0.1M, $\lambda_{light}$=254 nm, room temperature).

FIG. 1B represents a uranium uptake test in the form of uranyl nitrate in solution at neutral pH with UO$_2$(NO$_3$)$_2$ and poly(4-vinylpyridine-2,6-dicarboxylic acid). ($C_{uranyl}$=0.1 M, $C_{polymer}$=0.2 M, $\lambda_{light}$=254 nm, room temperature). The uptake of uranyl ions is total, within the detection limit (>98%).

EXAMPLES

Example 1: Synthesis of the dimethyl 4-vinylpyridine-2,6-dicarboxylate monomer a. Synthesis of 4-hydroxypyridine-2,6-dicarboxylic acid

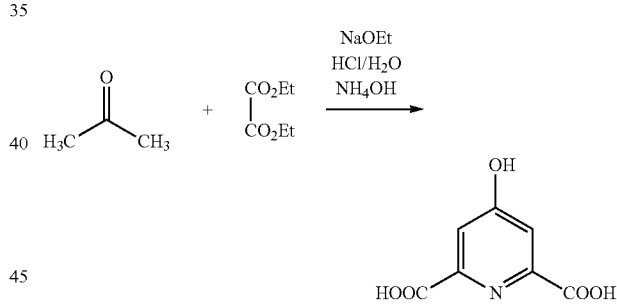

This reaction is known in the prior art, in particular in the reference. RSC Adv., 2014, 4, 25486.

b. Synthesis of dimethyl 4-chloropyridine-2,6-dicarboxylate

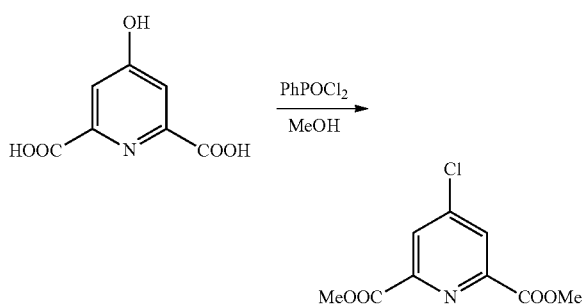

This reaction is known in the prior art, in particular in the reference J. Chem. Soc., Dalton Trans., 2000, 2031-2043.

c. Synthesis of dimethyl 4-iodopyridine-2,6-dicarboxylate

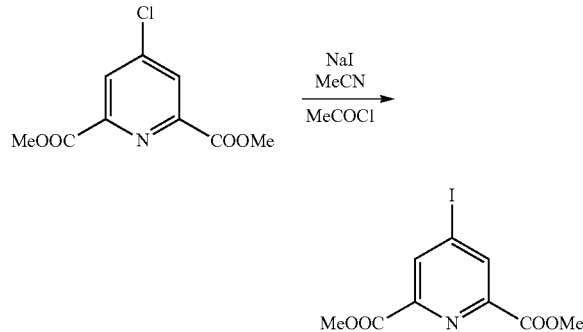

This reaction is known in the prior art, in particular in the reference Tetrahedron, 2008, 64, 399-411.

d. Synthesis of dimethyl 4-vinylpyridine-2,6-dicarboxylate

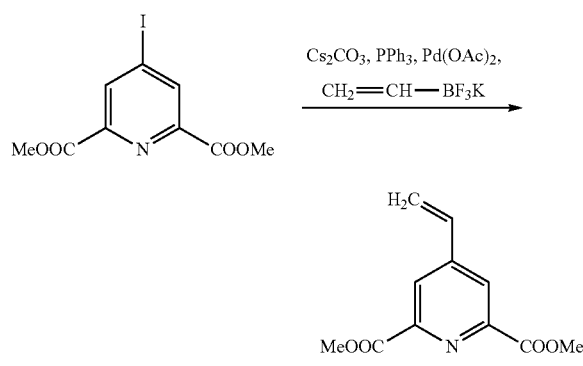

2-Dimethyl 4-iodopyridine-2,6-dicarboxylate (6.2 mmol) is added to a flask with 1 mmol of triphenylphosphine, and 0.33 mmol of Palladium(II) acetate. These compounds are dissolved in 20 mL of a THF/water solution (Ratio 9/1). Cesium(III) carbonate (19 mmol) and potassium vinyl trifluoroborate (7.5 mmol) are added to the mixture. The medium is heated at 85° C. for 8 h with stirring, then cooled and finally filtered. The white residue obtained is washed with ethyl acetate and then concentrated. The concentrate obtained is purified on silica gel. Elution with a mixture of petroleum ether and ethyl acetate (Ratio 3/1) makes it possible to obtain the dimethyl 4-vinylpyridine-2,6-dicarboxylate in the form of one gram of white solid at 78% by mass, recrystallized from a mixture of dichloromethane and petroleum ether (Ratio 1/10).

Example 2: Synthesis of Linear poly(4-vinylpyridine-2,6-dicarboxylic acid)

a. Synthesis of Linear poly(4-vinylpyridine-2,6-dimethyl ester)

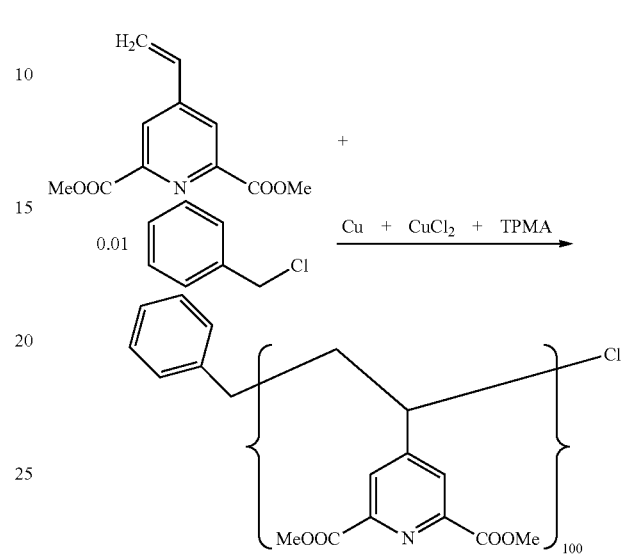

4-vinylpyridine-2,6-dimethyl ester (0.5 mmol) is dissolved in 1 ml of acetonitrile solvent. Copper(II) chloride (0.05 µmol) is added to the solution, as well as 0.2 µmol of tri-(2-picolyl) amine and 1 cm of copper wire (D 1 mm). Benzyl chloride (halogenated initiator) is added up to 5 µmol. The reactor is heated at 25° C. for 1 h with stirring. The polymer obtained is then precipitated from a mixture of THF and methanol of molar ratio (1/1). The precipitate obtained is filtered. The radical polymerization is of SARA ATRP type. The reaction was also carried out at a temperature of 30 and 50° C.

b. Synthesis of Linear poly(4-vinylpyridine-2,6-dicarboxylic acid)

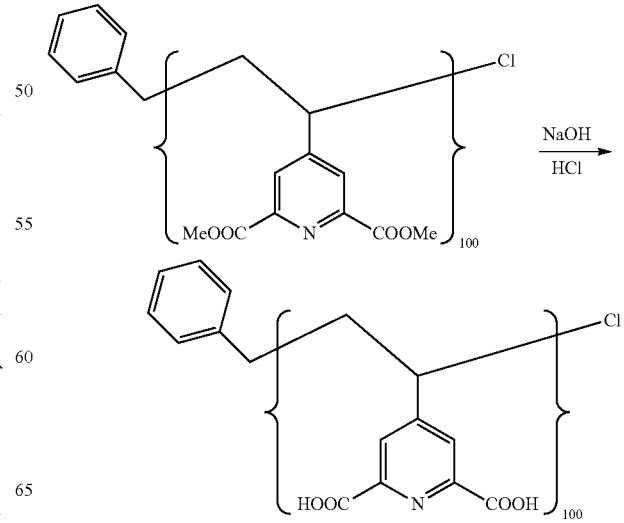

The precipitate obtained previously and containing the linear poly(4-vinylpyridine-2,6-dimethyl ester) is re-solubilized in 1 ml of acetonitrile then hydrolyzed with 1 ml of a 1 M NaOH solution. 2 M hydrochloric acid is added until a pH of 2 is reached. The poly(4-vinylpyridine-2,6-dicarboxylic acid) precipitates and is recovered (molar yield of 80%).

Example 3: Synthesis of Block Poly[(4-vinylpyridine-2,6-dimethyl ester)-styrene]

a. Preparation of the First Block of Polystyrene

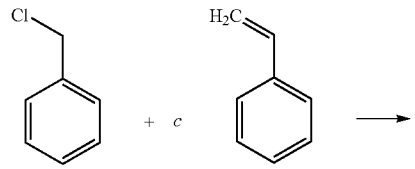

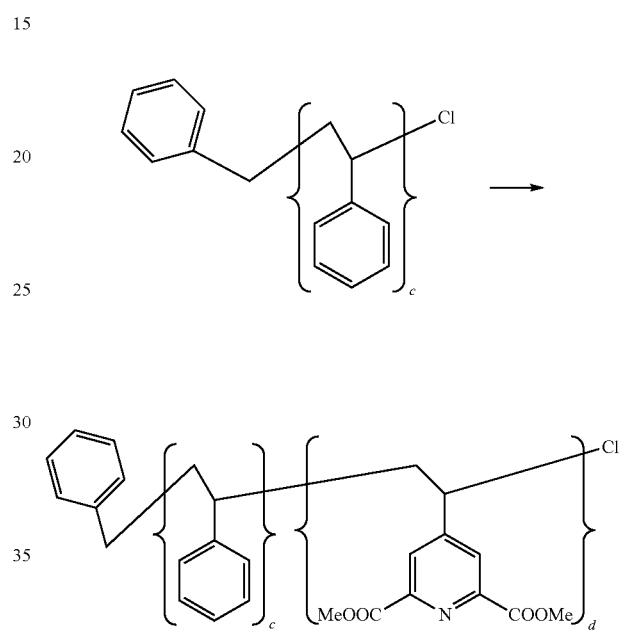

Styrene (1 mL) is dissolved in 1 ml of sulfolane solvent. Copper(II) chloride (0.25 mg) is added to the solution, as well as 5 mg of tri-(2-picolyl) amine and 1 cm of copper wire per milliliter of solution (D 1 mm). Benzyl chloride (halogenated initiator) is added up to 10 μL. The reactor is heated at 60° C. for 10 h with stirring. The polymer obtained is then precipitated in methanol. The precipitate is filtered. The radical polymerization is of SARA ATRP type.

b. Polymerization of the Block of 4-vinylpyridine Derivatives

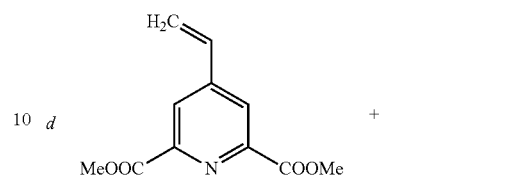

4-vinylpyridine-2,6-dimethyl ester (0.5 mmol) is dissolved in 1 ml of dimethylsulfoxide/sulfolane solvent (Ratio 1/1). Copper(II) chloride (0.05 μmol) is added to the solution, as well as 0.2 μmol of tri-(2-picolyl) amine and 1 cm of copper wire (D 1 mm). The precipitate from step 1 is added. The reactor is heated at 50° C. for 1 h with stirring. The polymer obtained is then precipitated in methanol. The precipitate obtained is filtered. The radical polymerization is of SARA ATRP type.

Example 4: Synthesis of the Cross-Linked poly(4-vinylpyridine-2,6-dicarboxylic acid)-1,4-divinylbenzene

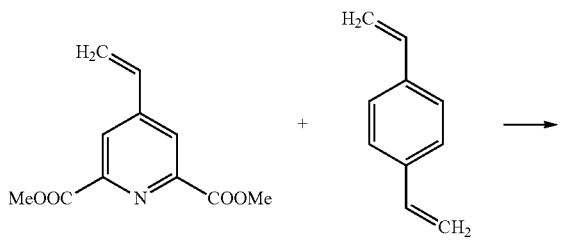

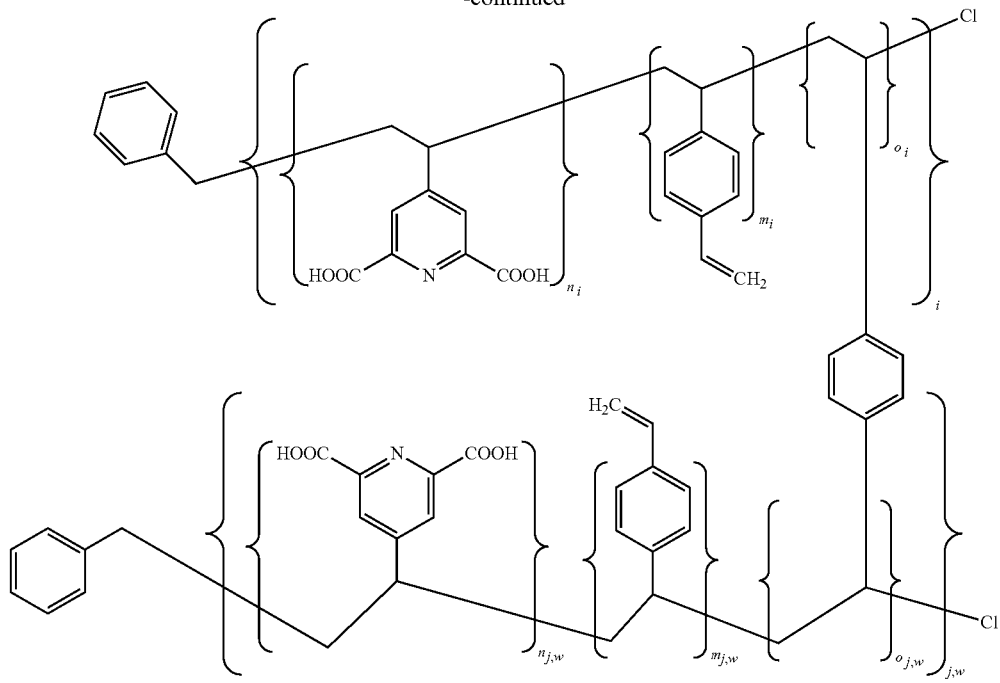

4-vinylpyridine-2,6-dimethyl ester (0.5 mmol) is dissolved in 1 ml of dimethylsulfoxide solvent with 0.01 mmol of 1,4-divinylbenzene. Copper(II) chloride (0.05 μmol) is added to the solution, as well as 0.2 μmol of tri-(2-picolyl) amine and 1 cm of copper wire (D 1 mm). Benzyl chloride (halogenated initiator) is added up to 5 μmol. The reactor is heated to a temperature between 60 and 80° C. with stirring until the medium gels. The gel obtained is then filtered, washed using dimethylsulfoxide and dried. The radical polymerization is of SARA ATRP type.

Example 5: Uranium Capture in Fresh Water

A solution of linear poly(4-vinylpyridine-2,6-dicarboxylic acid of 80 μl to 5 M is added to a solution of distilled water of 1920 μl containing 200 μmol of uranyl nitrate $UO_2(NO_3)_2$. The solution has a neutral pH. After 5 minutes at room temperature, the complex of poly(2,6 dicarboxylic acid-4-vinylpyridine) and uranium precipitates. More than 98% (detection limit) of the uranium is precipitated with the polymer.

Example 6: Uranium Capture in Simulated Seawater

A linear solution of poly(4-vinylpyridine-2,6-dicarboxylic acid) of 80 μl to 5 M is added to a simulated aqueous solution of seawater of 1920 μl containing 200 μmol of uranyl nitrate $UO_2(NO_3)_2$. The simulated seawater solution at a pH of 8 and an ionic strength of 0.44. After 5 minutes at room temperature, the complex of poly(4-vinylpyridine-2,6-dicarboxylic acid) and uranium precipitates. More than 98% (detection limit) of the uranium is precipitated with the polymer.

The invention claimed is:

1. A composition comprising a polymer having a degree of polymerization n, ranging from 2 to 10000, and containing 2 to 10000 monomer units, said monomer units being: either monomer units derived from 4-vinylpyridine, in which the carbons in position 2 and 6 are substituted by one of the substituents of the following group: carboxylic acid, or ester of 1 to 20 carbons, or monomer units derived from a co-monomer, provided that said monomer units derived from 4-vinylpyridine represent at least 20% of the degree of polymerization n, said polymer being optionally complexed with a metal, said polymer being linear or cross-linked.

2. The composition according to claim 1, comprising a linear or cross-linked polymer consisting of a monomer unit, of Formula I,

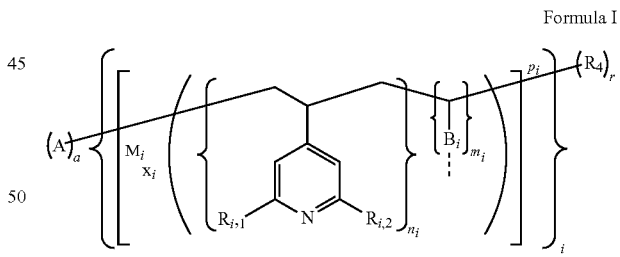

Formula I in which:
$R_4$ is a compound allowing the propagation of the polymerization, whether or not originating from a polymerization initiator, or allowing the termination of the polymerization, or a transfer agent,
A is a compound derived from said polymerization initiator or a fragment derived from the polymerization method,
a and r are identical or different and are 0 or 1,
i is a strictly positive, indexed integer, varying from 1 to n, itself comprised from 2 to 10000,
and for each i:
$R_{i,1}$ and $R_{i,2}$ are substituents chosen from the following group: carboxylic acid, or ester of 1 to 20 carbons, $B_i$ is a monomer unit derived from a co-monomer, whether or not forming a cross-linking bridge, $M_i$ is a metal, $n_i$ et $m_i$, are integers equal to 0 or 1, $n_i + m_i = 1$, $x_i$ is a number comprised from 0 to 6, $p_i$ is the electrical charge of the metal complex ranging from −6 to +6, said polymer being linear when there is no $B_i$ forming a cross-linking bridge, said polymer being cross-linked when there is at least one $B_i$ forming a cross-linking bridge between two linear polymers, or comprising a non-cross-linked linear polymer consisting of monomer unit, of Formula II,

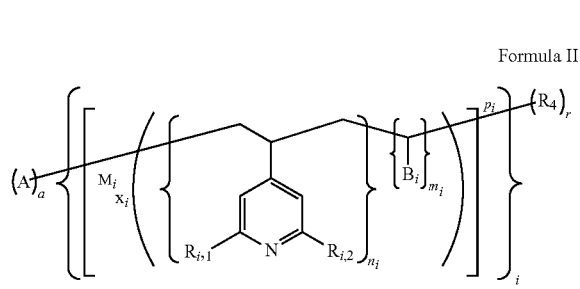

Formula II in which:

the definitions of $R_{i,1}$, $R_{i,2}$, A, $R_4$, a, r, $M_i$, $x_i$, $n_i$, $m_i$, $p_i$ and i are as described for Formula I, $B_i$ is a monomer unit derived from a co-monomer which does not form a cross-linking bridge.

3. Composition according to claim 1, comprising a polymer of Formula III,

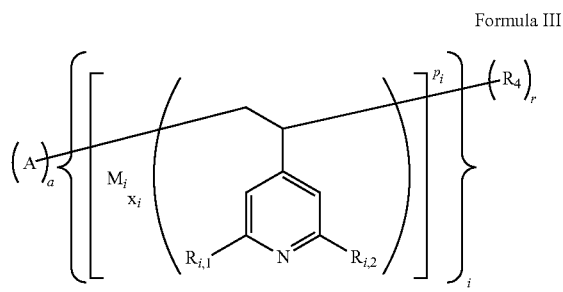

Formula III in which:

$R_4$ is a compound allowing the propagation of the polymerization, whether or not originating from a polymerization initiator, or allowing the termination of the polymerization, or a transfer agent, A is a compound derived from said polymerization initiator or a fragment derived from the polymerization method, a and r are identical or different and are 0 or 1, i is a strictly positive, indexed integer, varying from 1 to n, itself comprised from 2 to 10000, and for each i:

$R_{i,1}$ and $R_{i,2}$ are substituents chosen from the following group: carboxylic acid, or ester of 1 to 20 carbons, $M_i$ is a metal, $x_i$ is a number comprised from 0 to 6, $p_i$ is the electrical charge of the metal complex ranging from −6 to +6.

4. The composition according to claim 1, comprising a homopolymer of 2,6-dicarboxyl-4-vinylpyridine of Formula V,

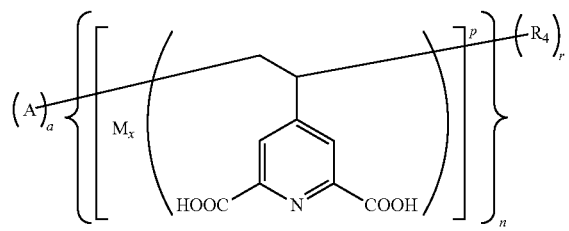

Formula V in which:

$R_4$ is a compound allowing the propagation of the polymerization, whether or not originating from a polymerization initiator, or allowing the termination of the polymerization, or a transfer agent, A is a compound derived from said polymerization initiator or a fragment derived from the polymerization method, a and r are identical or different and are 0 or 1, M is a metal, x is a number comprised from 0 to 6, p is the electrical charge of the metal complex ranging from −6 to +6, or comprising a homopolymer of 2,6-dicarboxyl-4-vinylpyridine represented by Formula VI,

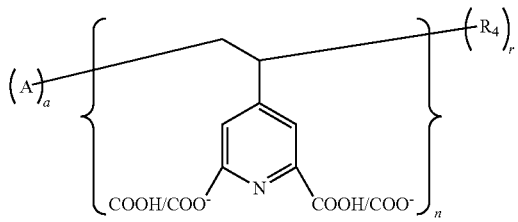

Formula VI in which:

the definitions of $R_4$, A, a and r are as described for Formula V, or comprising a homopolymer of Formula XII,

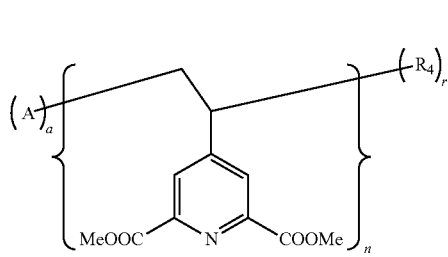

Formula XII in which:

the definitions of A, $R_4$, r, and a are as described for Formula V, or comprising a homopolymer of 2,6-dicarboxyl-4-vinylpyridine complexed with uranium, represented by Formula XIII,

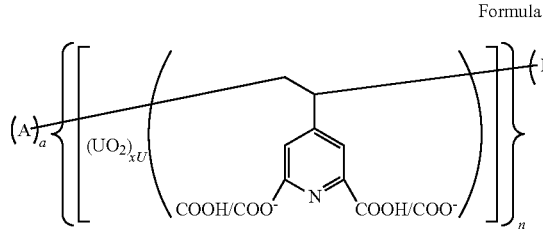

Formula XIII in which:

the definitions of A, $R_4$, r, a are as described for Formula V, xU is a number comprised from 0 to 1.

5. The composition according to claim 1, comprising a polymer with at least one monomer unit derived from a co-monomer, or comprising a polymer with at least one monomer unit derived from a co-monomer, in which the level of monomer unit derived from a co-monomer varies from a value strictly greater than 0% to a value less than 80%.

6. The composition according to claim 1, comprising a polymer with at least one monomer unit derived from a co-monomer, said monomer units being derived from styrene or acrylic acid, or comprising a polymer with at least one monomer unit derived from a co-monomer, said monomer units being derived from styrene or acrylic acid, in which the level of monomer unit derived from a co-monomer varies from a value strictly greater than 0% to a value less than 80%.

7. The composition according to claim 1, comprising a block copolymer of Formula XVIII,

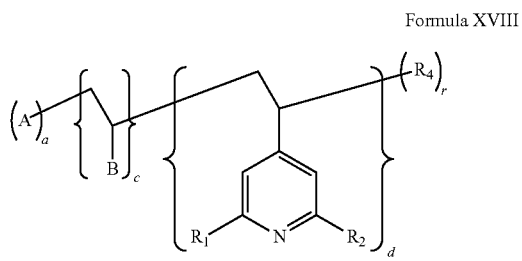

Formula XVIII in which:

$R_4$ is a compound allowing the propagation of the polymerization, whether or not originating from a polymerization initiator, or allowing the termination of the polymerization, or a transfer agent, A is a compound derived from said polymerization initiator or a fragment derived from the polymerization method, a and r are identical or different and are 0 or 1, $R_1$ and $R_2$ are substituents chosen from the following group: carboxylic acid, or ester of 1 to 20 carbons, B is a monomer unit derived from a non-forming co-monomer cross-linking bridge, d is the degree of polymerization of the block consisting of monomer units derived from 4-vinylpyridine and a is an integer, c is the degree of polymerization of the block consisting of monomer units derived from co-monomer and b is an integer, c+d=n, or comprising a two-block copolymer of Formula XIX a

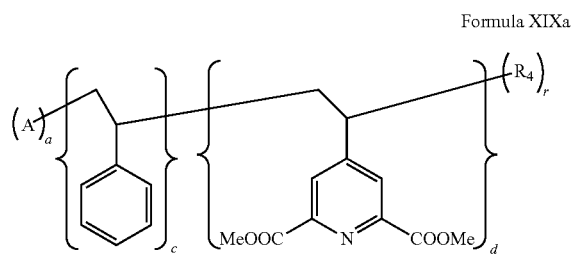

Formula XIXa in which:

the definitions of A, $R_4$, a, r, c and d are as described for Formula XVIII.

8. The composition according to claim 1, comprising a cross-linked copolymer, said polymer being of Formula XX,

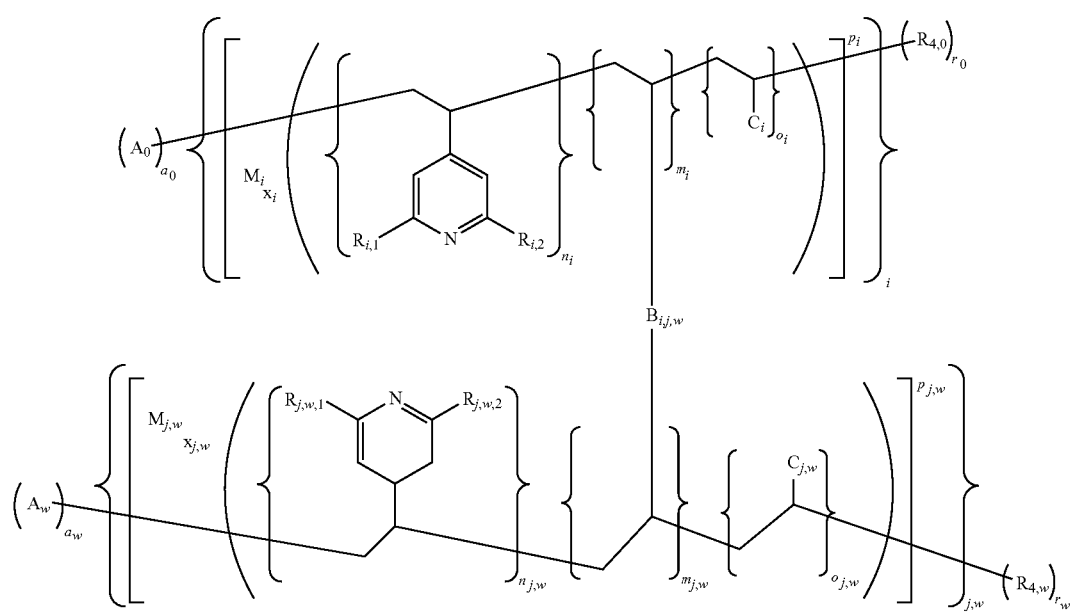

Formula XX in which:
- W is a strictly positive, indexed integer varying from 1 to the number of polymers cross-linked with the polymer of index 0, itself comprised from 1 to 1000,
- $A_0$ and $A_w$ are compounds derived from polymerization initiators,
- $R_{4,0}$ and $R_{4,w}$ are compounds allowing the propagation of the polymerization, whether or not originating from said polymerization initiator, or allowing the termination of the polymerization, or a transfer agent,
- $a_0$, $r_0$, $a_w$ and $r_w$ are identical or different and are 0 or 1,
- i and j, w are integers which are strictly positive, indexed, varying respectively from 1 to $n_i$ and 1 to $n_{j,w}$, $n_i$ and $n_{j,w}$ being comprised from 1 to 9999,
- $n_i + n_{3,w} = n$, n being comprised from 3 to 10000, and for each i and each j, w:
- $R_{i,1}$, $R_{i,2}$, $R_{j,w,1}$ and $R_{j,w,2}$ are substituents chosen from the following group: carboxylic acid, or ester from 1 to 20 carbons,
- $B_{i,j,w}$ is a monomer unit derived from a co-monomer, forming a cross-linking bridge between the polymer 0 in position i and the polymer of index w in position j,
- $C_i$ and $C_{j,w}$ are monomer units derived from a co-monomer which does not form a cross-linking bridge,
- $n_i$, $m_i$, $o_i$, $n_{j,w}$, $m_{j,w}$, and $o_{j,w}$, are integers equal to 0 or 1,
- $n_i + m_i + o_i = 1$,
- $n_{j,w} + m_{j,w} + o_{j,w} = 1$,
- the sum of the $o_{j,w}$ is non-zero and the sum of the $o_i$ is non-zero, or comprising a cross-linked copolymer of Formula XXI:

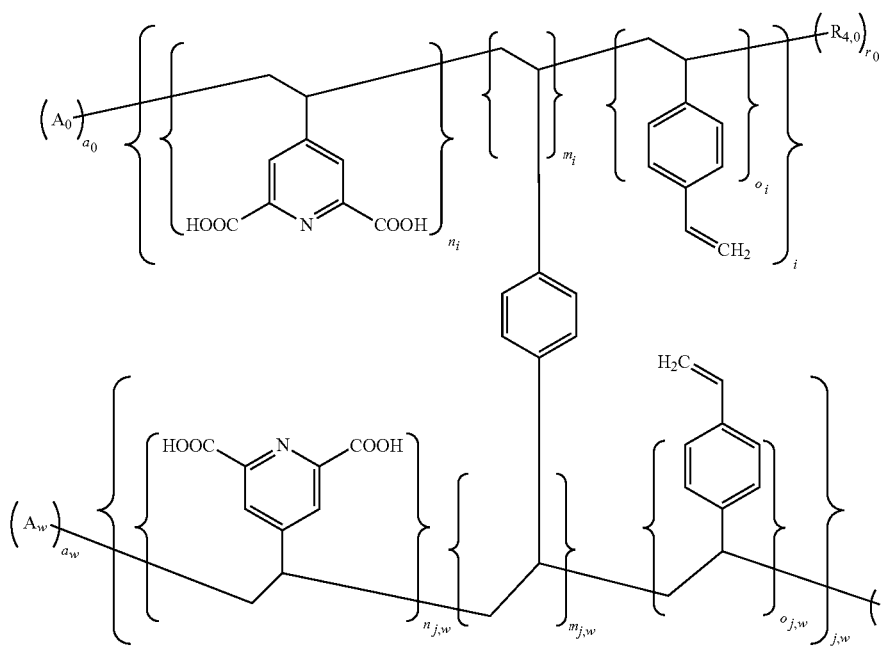

Formula XXI in which:

the definitions of w, $A_0$, $A_w$, $a_0$, $a_w$, i, j, w, $n_i$, $n_{j,w}$, $m_i$, $m_{j,w}$, $o_i$, $o_{j,w}$, $R_{4,0}$, $R_{4,w}$, $r_0$ and $r_w$ are as described for Formula XX.

9. The composition according to claim 1, comprising a polymer in which said polymer is complexed with a metal, or with a metal chosen from actinides, lanthanides or transition metals, or with uranium.

10. The composition according to claim 1, comprising a polymer soluble in aqueous solution or in sea water,
or comprising a polymer complexed with a soluble or insoluble metal in aqueous solution,
or comprising a polymer soluble in aqueous solution not complexed with a metal and insoluble in solution complexed with a metal, or with uranium.

11. The composition according to claim 1, comprising a polymer soluble in organic solvents, or in acetonitrile, or dimethylsulfoxide (DMSO).

12. The composition according to claim 1, comprising a polymer in which A, Ao and Aw are derived from a polymerization initiator chosen from 4-(chloromethyl)-benzoyl chloride, benzyl chloride, AIBN, methyl-2-bromo-2-methylpropanoate, said polymer being of Formula I,

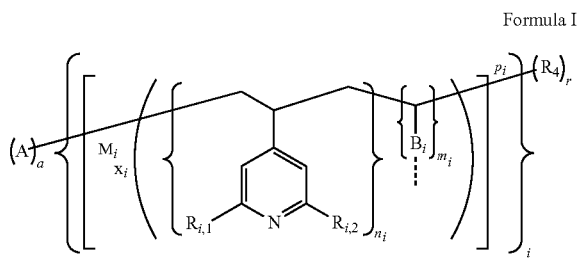

Formula I in which:

R$_4$ is a compound allowing the propagation of the polymerization, whether or not originating from a polymerization initiator, or allowing the termination of the polymerization, or a transfer agent, a and r are identical or different and are 0 or 1, i is a strictly positive, indexed integer, varying from 1 to n, itself comprised from 2 to 10000, and for each i:

$R_{i,1}$ and $R_{i,2}$ are substituents chosen from the following group: carboxylic acid, or ester of 1 to 20 carbons, $B_i$ is a monomer unit derived from a co-monomer, whether or not forming a cross-linking bridge, $M_i$ is a metal, $n_i$ et $m_i$, are integers equal to 0 or 1, $n_i + m_i = 1$, $x_i$ is a number comprised from 0 to 6, $p_i$ is the electrical charge of the metal complex ranging from $-6$ to $+6$, said polymer being linear when there is no $B_i$ forming a cross-linking bridge, said polymer being cross-linked when there is at least one $B_i$ forming a cross-linking bridge between two linear polymers, or said polymer being of Formula II

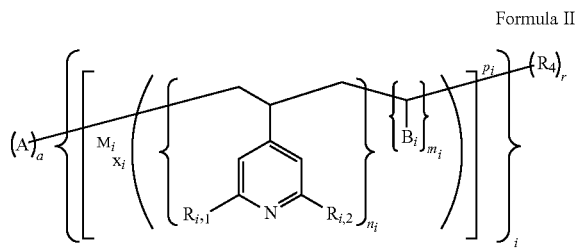

Formula II in which:

the definitions of $R_{i,1}$, $R_{i,2}$, $R_4$, a, r, $M_i$, $x_i$, $n_i$, $m_i$, $p_i$ and i are as described for Formula I, $B_i$ is a monomer unit derived from a co-monomer which does not form a cross-linking bridge, or said polymer being of Formula III

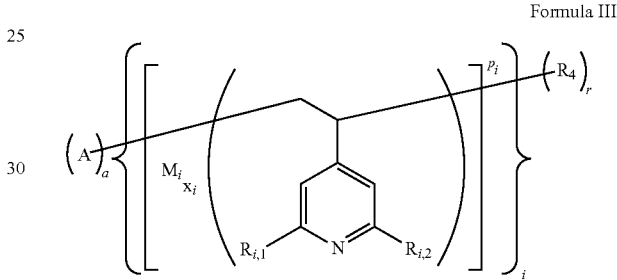

Formula III in which:

R$_4$ is a compound allowing the propagation of the polymerization, whether or not originating from a polymerization initiator, or allowing the termination of the polymerization, or a transfer agent, a and r are identical or different and are 0 or 1, i is a strictly positive, indexed integer, varying from 1 to n, itself comprised from 2 to 10000, and for each i:

$R_{i,1}$ and $R_{i,2}$ are substituents chosen from the following group: carboxylic acid, or ester of 1 to 20 carbons, $M_i$ is a metal, $x_i$ is a number comprised from 0 to 6, $p_i$ is the electrical charge of the metal complex ranging from $-6$ to $+6$, or said polymer being of Formula XVIII,

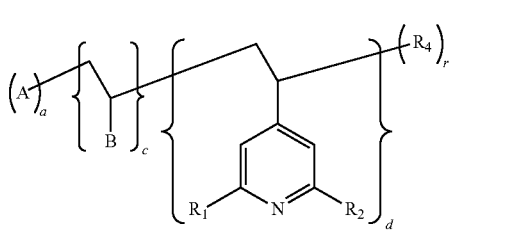

Formula XVIII in which:
- $R_4$ is a compound allowing the propagation of the polymerization, whether or not originating from a polymerization initiator, or allowing the termination of the polymerization, or a transfer agent,
- a and r are identical or different and are 0 or 1,
- $R_1$ and $R_2$ are substituents chosen from the following group: carboxylic acid, or ester of 1 to 20 carbons,
- B is a monomer unit derived from a non-forming co-monomer cross-linking bridge,
- d is the degree of polymerization of the block consisting of monomer units derived from 4-vinylpyridine and a is an integer,
- c is the degree of polymerization of the block consisting of monomer units derived from co-monomer and b is an integer,
- c+d=n, or said polymer being of Formula XX, and for each i and each j, w:
- $R_{i,1}, R_{i,2}, R_{j,w,1}$ and $R_{j,w,2}$ are substituents chosen from the following group: carboxylic acid, or ester from 1 to 20 carbons,
- $B_{i,j,w}$ is a monomer unit derived from a co-monomer, forming a cross-linking bridge between the polymer 0 in position i and the polymer of index w in position j,
- $C_i$ and $C_{j,w}$ are monomer units derived from a co-monomer which does not form a cross-linking bridge,
- $n_i, m_i, o_i, n_{j,w}, m_{j,w},$ and $o_{j,w}$ are integers equal to 0 or 1,
- $n_i+m_i+o_i=1$,
- $n_{j,w}+m_{j,w}+o_{j,w}=1$,
- the sum of the $o_{j,w}$ is non-zero and the sum of the $o_i$ is non-zero.

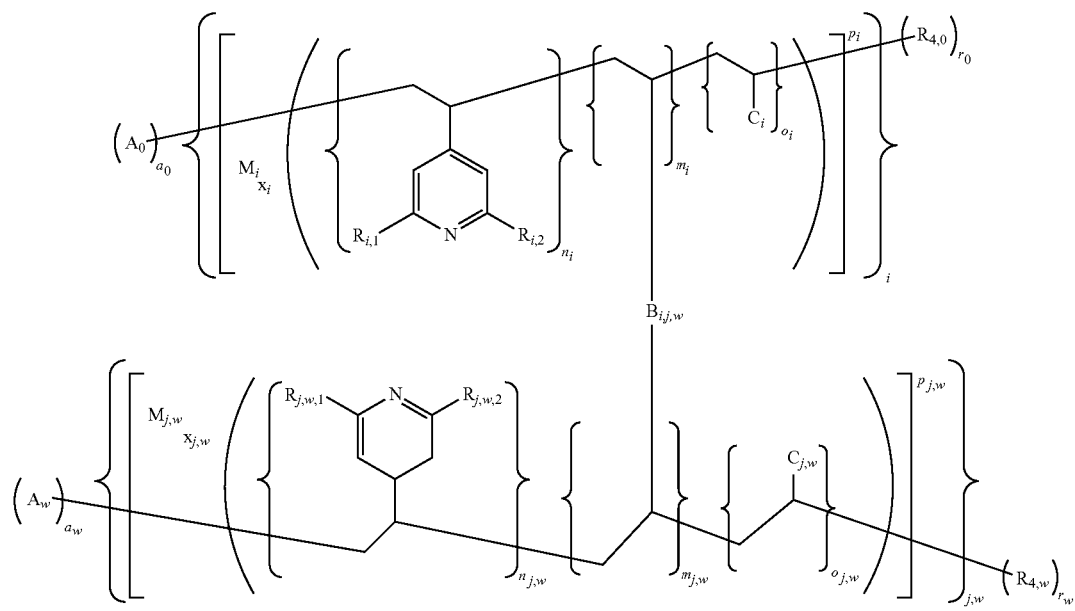

Formula XX in which:
- W is a strictly positive, indexed integer varying from 1 to the number of polymers cross-linked with the polymer of index 0, itself comprised from 1 to 1000,
- $R_{4,0}$ and $R_{4,w}$ are compounds allowing the propagation of the polymerization, whether or not originating from said polymerization initiator, or allowing the termination of the polymerization, or a transfer agent,
- $a_0, r_0, a_w$ and $r_w$ are identical or different and are 0 or 1,
- i and j, w are integers which are strictly positive, indexed, varying respectively from 1 to $n_i$ and 1 to $n_{j,w}$, $n_i$ and $n_{j,w}$, being comprised from 1 to 9999,
- $n_i+n_{j,w}=n$, n being comprised from 3 to 10000, 13. The composition according to claim 1, comprising a polymer in which R4, R4,0 et R4,w are chosen from a chlorine atom, or the compounds of Formula XXII,

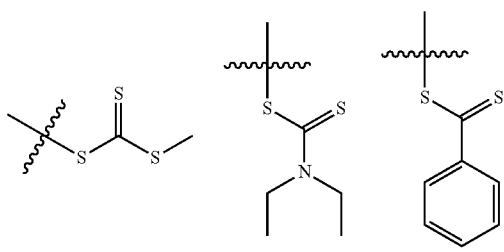

Formula XXII or comprising a polymer of Formula XXIII,

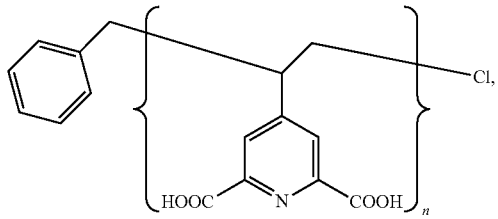

Formula XXIII said polymer being of Formula I,

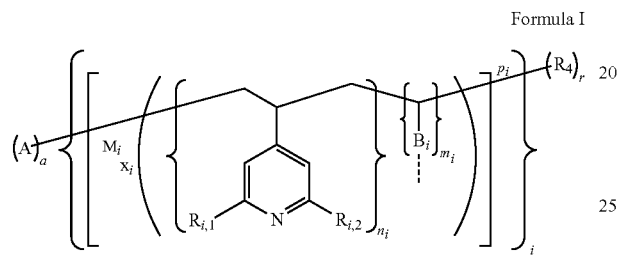

Formula I in which:
A is a compound derived from said polymerization initiator or a fragment derived from the polymerization method,
a and r are identical or different and are 0 or 1,
i is a strictly positive, indexed integer, varying from 1 to n, itself comprised from 2 to 10000,
and for each i:
$R_{i,1}$ and $R_{i,2}$ are substituents chosen from the following group: carboxylic acid, or ester of 1 to 20 carbons,
$B_i$ is a monomer unit derived from a co-monomer, whether or not forming a cross-linking bridge,
$M_i$ is a metal,
$n_i$ et $m_i$, are integers equal to 0 or 1,
$n_i + m_i = 1$,
$x_i$ is a number comprised from 0 to 6,
$p_i$ is the electrical charge of the metal complex ranging from −6 to +6,
said polymer being linear when there is no $B_i$ forming a cross-linking bridge,
said polymer being cross-linked when there is at least one $B_i$ forming a cross-linking bridge between two linear polymers,
or said polymer being of Formula II

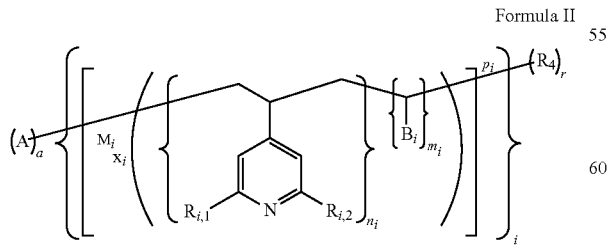

Formula II in which:
the definitions of $R_{i,1}$, $R_{i,2}$, A, a, r, $M_i$, $x_i$, $n_i$, $m_i$, $p_i$ and i are as described for Formula I, $B_i$ is a monomer unit derived from a co-monomer which does not form a cross-linking bridge,
or said polymer being of Formula III

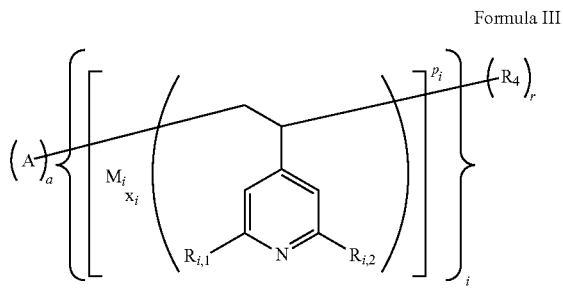

Formula III in which:
A is a compound derived from said polymerization initiator or a fragment derived from the polymerization method,
a and r are identical or different and are 0 or 1,
i is a strictly positive, indexed integer, varying from 1 to n, itself comprised from 2 to 10000,
and for each i:
$R_{i,1}$ and $R_{i,2}$ are substituents chosen from the following group: carboxylic acid, or ester of 1 to 20 carbons,
$M_i$ is a metal,
$x_i$ is a number comprised from 0 to 6,
$p_i$ is the electrical charge of the metal complex ranging from −6 to +6,
or said polymer being of Formula XVIII,

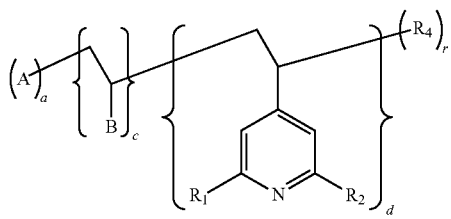

Formula XVIII in which:
A is a compound derived from said polymerization initiator or a fragment derived from the polymerization method,
a and r are identical or different and are 0 or 1,
$R_1$ and $R_2$ are substituents chosen from the following group: carboxylic acid, or ester of 1 to 20 carbons,
B is a monomer unit derived from a non-forming co-monomer cross-linking bridge,
d is the degree of polymerization of the block consisting of monomer units derived from 4-vinylpyridine and a is an integer,
c is the degree of polymerization of the block consisting of monomer units derived from co-monomer and b is an integer,
c+d=n, or said polymer being of Formula XX,

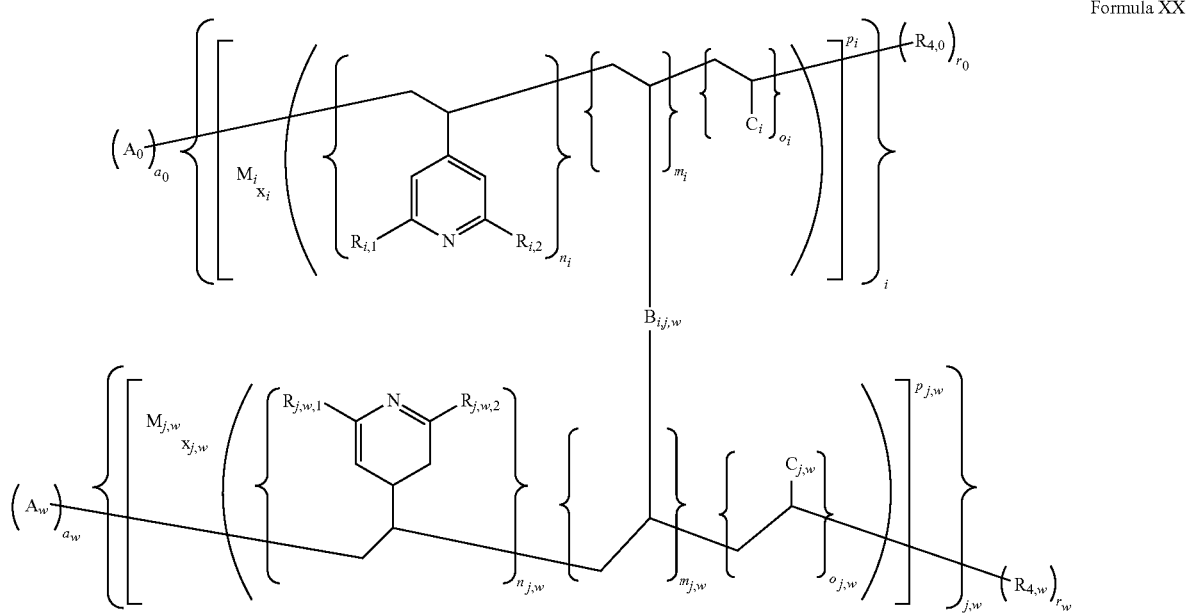

Formula XX in which:
W is a strictly positive, indexed integer varying from 1 to the number of polymers cross-linked with the polymer of index 0, itself comprised from 1 to 1000,
$A_0$ and $A_w$ are compounds derived from polymerization initiators,
$a_0$, $r_0$, $a_w$ and $r_w$ are identical or different and are 0 or 1,
i and j, w are integers which are strictly positive, indexed, varying respectively from 1 to $n_i$ and 1 to $n_{j,w}$, $n_i$ and $n_{j,w}$ being comprised from 1 to 9999,
$n_i + n_{j,w} = n$, n being comprised from 3 to 10000,
and for each i and each j, w:
$R_{i,1}$, $R_{i,2}$, $R_{j,w,1}$ and $R_{j,w,2}$ are substituents chosen from the following group: carboxylic acid, or ester from 1 to 20 carbons,
$B_{i,j,w}$ is a monomer unit derived from a co-monomer, forming a cross-linking bridge between the polymer 0 in position i and the polymer of index w in position j,
$C_i$ and $C_{j,w}$ are monomer units derived from a co-monomer which does not form a cross-linking bridge,
$n_i$, $m_i$, $o_i$, $n_{j,w}$, $m_{j,w}$, and $o_{j,w}$ are integers equal to 0 or 1,
$n_i + m_i + o_i = 1$,
$n_{j,w} + m_{j,w} + o_{j,w} = 1$,
the sum of the $o_{j,w}$ is non-zero and the sum of the $o_i$ is non-zero.

14. A method for the preparation of a polymer having a degree of polymerization n, ranging from 2 to 10000, and containing 2 to 10000 monomer units, said monomer units being:
either monomer units derived from 4-vinylpyridine, in which the carbons in position 2 and 6 are substituted by one of the substituents of the following group: carboxylic acid, or ester of 1 to 20 carbons,
or monomer units derived from a co-monomer,
provided that said monomer units derived from 4-vinylpyridine represent at least 20% of the degree of polymerization n,
said polymer being optionally complexed with a metal,
said polymer being linear or cross-linked, said method comprising the following steps:
A radical polymerization step starting with the initiation of a polymerization initiator to obtain an initiated polymerization initiator followed by the contacting of said initiated polymerization initiator with,
at least one monomer derived from 4-vinylpyridine in which the carbons in position 2 and 6 are substituted by ester of 1 to 20 carbons,
and optionally with at least a co-monomer,
with or without cross-linking,
to obtain a polymer,
optionally a modification step by bringing said polymer into contact with a reagent to modify at least one of the above substituents in position 2 and/or 6, in order to obtain a optionally modified polymer,
optionally a complexation step by bringing said optionally modified polymer into contact with a metal to obtain an optionally modified and optionally complexed polymer.

15. The method of preparation according to claim 14, wherein the polymer is a polymer of Formula I:

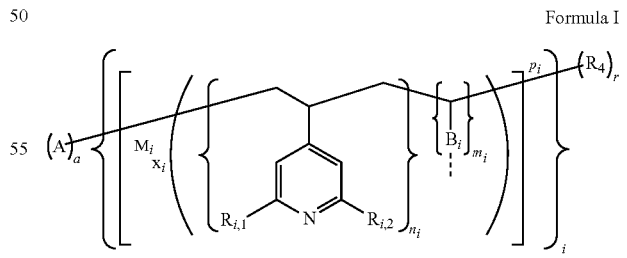

Formula I in which:
$R_4$ is a compound allowing the propagation of the polymerization, whether or not originating from a polymerization initiator, or allowing the termination of the polymerization, or a transfer agent,
A is a compound derived from said polymerization initiator or a fragment derived from the polymerization method, a and r are identical or different and are 0 or 1,
i is a strictly positive, indexed integer, varying from 1 to n, itself comprised from 2 to 10000,
and for each i:
$R_{i,1}$ and $R_{i,2}$ are substituents chosen from the following group: carboxylic acid, or ester of 1 to 20 carbons,
$B_i$ is a monomer unit derived from a co-monomer, whether or not forming a cross-linking bridge,
$M_i$ is a metal,
$n_i$ et $m_i$, are integers equal to 0 or 1,
$n_i+m_i=1$,
$x_i$ is a number comprised from 0 to 6,
$p_i$ is the electrical charge of the metal complex ranging from −6 to +6,
said polymer being linear when there is no $B_i$ forming a cross-linking bridge,
said method comprising:
a step of radical polymerization starting with the initiation of a polymerization initiator then continuing with the contacting of said initiated polymerization initiator with a 4-vinylpyridine derivative of Formula XXIV, Formula XXIV

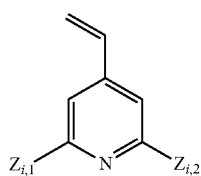

in which:
$Z_{i,1}$ et $Z_{i,2}$ are ester from 1 to 20 carbons,
with optionally at least one co-monomer,
with or without cross-linking bridge,
to obtain the polymer of Formula XXV, Formula XXV

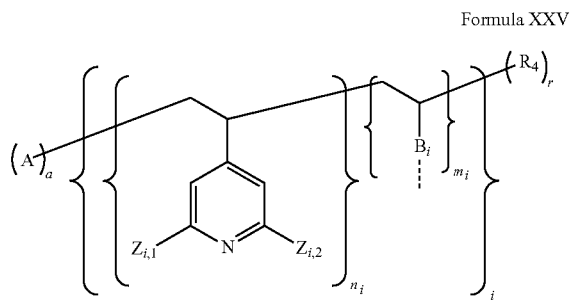

optionally a modification step when at least one of the $Z_{i,1}$ is different from $R_{i,1}$ or when at least one of the $Z_{i,2}$ is different from $R_{i,2}$, of said polymer of Formula XXV with a reagent containing a hydroxide anion, carbonate or phosphate, to obtain the polymer of Formula XXVI, Formula XXVI

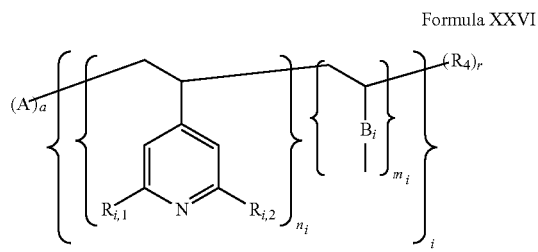

optionally a step of complexing said polymer of Formula XXVI with at least one metallic compound to obtain the polymer of Formula I.

16. The method of preparation according to claim 14, wherein the polymer is a polymer of Formula IV:

Formula IV

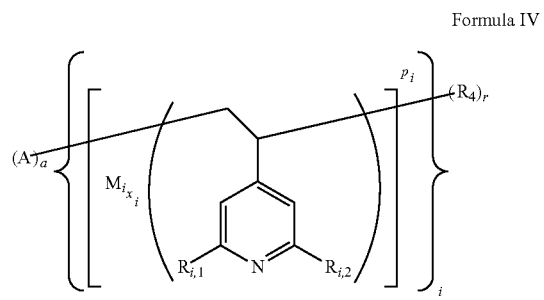

in which
$R_4$ is a compound allowing the propagation of the polymerization, whether or not originating from a polymerization initiator, or allowing the termination of the polymerization, or a transfer agent,
A is a compound derived from said polymerization initiator or a fragment derived from the polymerization method,
a and r are identical or different and are 0 or 1,
i is a strictly positive, indexed integer, varying from 1 to n, itself comprised from 2 to 10000,
and for each i:
$M_i$ is a metal,
$x_i$ is a number comprised from 0 to 6,
$p_i$ is the electrical charge of the metal complex ranging from −6 to +6,
$R_1$ et $R_2$ are substituents chosen from the following group: carboxylic acid, or ester of 1 to 20 carbons,
said method comprising:
a radical polymerization step starting with the initiation of a polymerization initiator then continuing by bringing said initiated polymerization initiator into contact with a monomer derived from 4-vinylpyridine of Formula XXXI, Formula XXXI

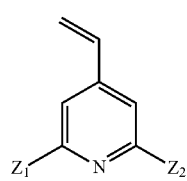

in which
$Z_1$ and $Z_2$ are ester of 1 to 20 carbons,
to obtain a polymer of Formula XXXII, Formula XXXII

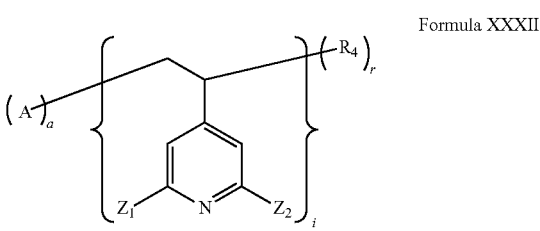

in which:
the definitions of A, R$_4$, i, r, and a are as described for Formula IV,
a modification step, when Z$_1$ is different from R$_1$ or when Z$_2$ is different from R$_2$, of said polymer of Formula XXXII with a reagent containing a hydroxide, carbonate or phosphate anion, to obtain the polymer of Formula XXXIII,

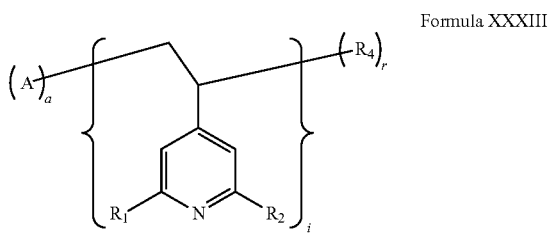

Formula XXXIII optionally a complexing step of said polymer of Formula XXXIII with at least one metal to obtain the polymer of Formula IV,
or wherein the polymer is a polymer of Formula V:

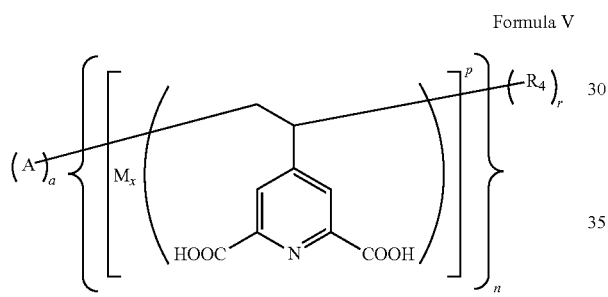

Formula V in which:
R$_4$ is a compound allowing the propagation of the polymerization, whether or not originating from a polymerization initiator, or allowing the termination of the polymerization, or a transfer agent,
A is a compound derived from said polymerization initiator or a fragment derived from the polymerization method,
a and r are identical or different and are 0 or 1,
M is a metal,
x is a number comprised from 0 to 6,
p is the electrical charge of the metal complex ranging from −6 to +6,
said method comprising:
a radical polymerization step starting with the initiation of a polymerization initiator and then continuing with the contacting of said initiated polymerization initiator with 4-vinylpyridine derivative of Formula XL,

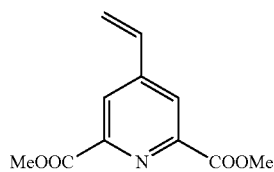

Formula XL to obtain a polymer of Formula XII,
a step of modifying said polymer of Formula XII with a base to obtain a polymer of Formula VI,
a step of complexing said polymer of Formula VI with a metal to obtain a polymer of Formula V.
17. The method of preparation according to claim 14, wherein the polymer is a polymer of Formula XVIII:

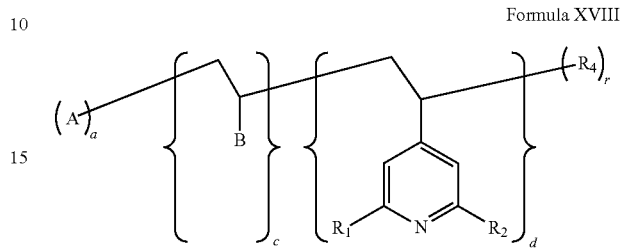

Formula XVIII in which:
R$_4$ is a compound allowing the propagation of the polymerization, whether or not originating from a polymerization initiator, or allowing the termination of the polymerization, or a transfer agent,
A is a compound derived from said polymerization initiator or a fragment derived from the polymerization method,
a and r are identical or different and are 0 or 1,
R$_1$ and R$_2$ are substituents chosen from the following group: carboxylic acid, or ester of 1 to 20 carbons,
B is a monomer unit derived from a non-forming co-monomer cross-linking bridge,
d is the degree of polymerization of the block consisting of monomer units derived from 4-vinylpyridine and a is an integer,
c is the degree of polymerization of the block consisting of monomer units derived from co-monomer and b is an integer,
c+d=n,
said method comprising:
a step of radical polymerization starting with 1 priming of a polymerization initiator then continuing by bringing said initiated polymerization initiator into contact with a monomer derived from 4-vinylpyridine of Formula XXXI,

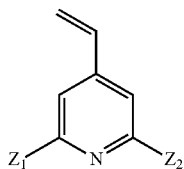

Formula XXXI in which:
Z$_1$ and Z$_2$ are ester of 1 to 20 carbons, with a polymer of Formula XXXIV,

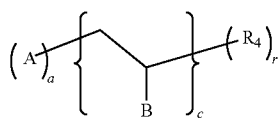

Formula XXXIV in which:
the definitions of A, $R_4$, a, and r are as described for Formula XVIII,
B is a monomer unit derived from a co-monomer which does not form a cross-linking bridge,
c is the degree of polymerization of the polymer and c is an integer strictly lower than 0.8 n,
to obtain the polymer of Formula XXXV,

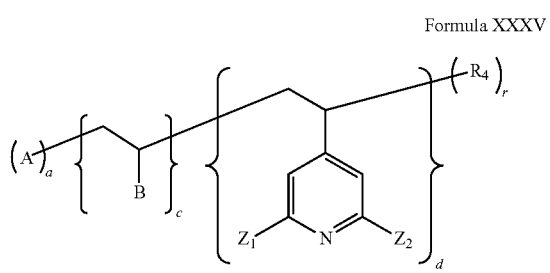

Formula XXXV in which:
d is an integer,
c+d=n,
a modification step, when $Z_1$ is different from $R_1$ or when $Z_2$ is different from $R_2$, of said polymer of Formula XXXV with a reagent containing an anion hydroxide, carbonate or phosphate, to obtain the polymer of Formula XVIII,
said method optionally comprising before the radical polymerization step by bringing a monomer derived from 4-vinylpyridine of Formula XXXI into contact with a polymer of Formula XXXIV,
a radical polymerization step of a co-monomer of Formula XXXVI to obtain said polymer of Formula XXXIV,

Formula XXXVI wherein the definition of B is a monomer unit derived from a co-monomer which does not form a cross-linking bridge.

18. The method of preparation according to claim 14, wherein the polymer is a copolymer of Formula XIX:

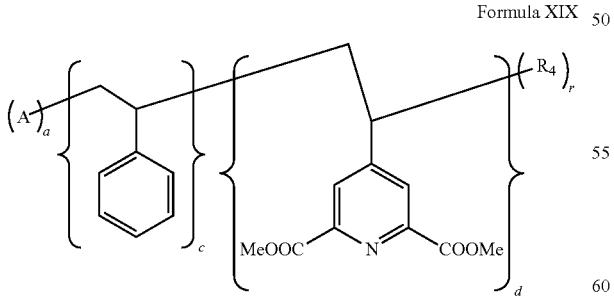

Formula XIX in which:
$R_4$ is a compound allowing the propagation of the polymerization, whether or not originating from a polymerization initiator, or allowing the termination of the polymerization, or a transfer agent,
A is a compound derived from said polymerization initiator or a fragment derived from the polymerization method,
a and r are identical or different and are 0 or 1,
d is the degree of polymerization of the block consisting of monomer units,
c is the degree of polymerization of the block consisting of monomer units derived from co-monomer, said method comprising:
a step of radical polymerization by bringing a polymer of Formula XLI into contact,

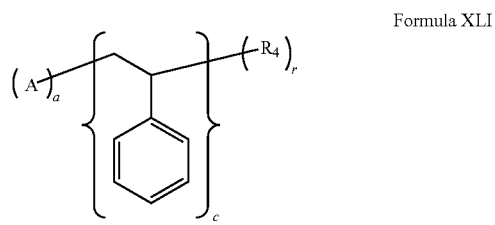

Formula XLI with 4-vinylpyridine derivative of Formula XL, to obtain the polymer of Formula XIX,
said method optionally comprising, before the radical polymerization step by bringing a monomer derived from 4-vinylpyridine of Formula XL into contact with a polymer of Formula XLI,
a step of radical polymerization of styrene, to obtain said polymer of Formula XIX.

19. The method for the preparation of a polymer, according to claim 14, in which the said radical polymerization step is a polymerization of the MP, RAFT, ATRP, SARA ATRP type or a conventional radical polymerization.

20. The method of fighting counterfeiting, comprising a step of labeling of organic and/or inorganic surfaces or luxury products with a composition comprising a polymer having a degree of polymerization n, ranging from 2 to 10000, and containing 2 to 10000 monomer units, said monomer units being:
either monomer units derived from 4-vinylpyridine, in which the carbons in position 2 and 6 are substituted by one of the substituents of the following group: carboxylic acid, or ester of 1 to 20 carbons,
or monomer units derived from a co-monomer,
provided that said monomer units derived from 4-vinylpyridine represent at least 20% of the degree of polymerization n,
said polymer being optionally complexed with a metal,
said polymer being linear or cross-linked.

* * * * *